United States Patent
Morgan et al.

(10) Patent No.: US 11,274,181 B2
(45) Date of Patent: Mar. 15, 2022

(54) POLYIMIDE DISPERSANTS AND METHODS OF MAKING AND USING THEREOF

(71) Applicant: Chevron Oronite Company LLC, San Ramon, CA (US)

(72) Inventors: David Morgan, Pleasanton, CA (US); Roland Ma, San Francisco, CA (US); Georgeta Masson, Lafayette, CA (US)

(73) Assignee: CHEVRON ORONITE COMPANY LLC, San Ramon, CA (US)

( * ) Notice: Subject to any disclaimer, the term of this patent is extended or adjusted under 35 U.S.C. 154(b) by 156 days.

(21) Appl. No.: 16/134,504

(22) Filed: Sep. 18, 2018

(65) Prior Publication Data

US 2019/0085129 A1   Mar. 21, 2019

Related U.S. Application Data

(60) Provisional application No. 62/560,041, filed on Sep. 18, 2017.

(51) Int. Cl.
  *C08G 73/10* (2006.01)
  *C10M 133/56* (2006.01)
  (Continued)

(52) U.S. Cl.
  CPC ......... *C08G 73/1007* (2013.01); *C08G 73/10* (2013.01); *C08G 73/1014* (2013.01);
  (Continued)

(58) Field of Classification Search
  CPC ........ C10L 10/18; C10L 1/2383; C10L 1/238; C10L 2270/026; C10L 2270/023;
  (Continued)

(56) References Cited

U.S. PATENT DOCUMENTS 4,935,490 A   6/1990   Hayes
5,036,146 A   7/1991   Hedtmann-Rich et al.
(Continued)

FOREIGN PATENT DOCUMENTS

WO   1994/13669   6/1994

OTHER PUBLICATIONS

International Search Report, dated Dec. 4, 2018, during the prosecution of International Application No. PCT/US2018/50526.
(Continued)

*Primary Examiner* — Taiwo Oladapo

(57) ABSTRACT

Provided herein are polyimide dispersants, as well as methods for producing polyimide dispersants. The polyimides can be defined by the formula below $$R\diagdown L-Y-[A-Y-]_n L\diagdown R$$

wherein A, individually for each occurrence, represents a cyclic diimide moiety represented by the structure below where B represents a cyclic moiety substituted with a first cyclic imide group and a second cyclic imide group; Y,
(Continued)

individually for each occurrence, represents a bivalent linking group; L, individually for each occurrence, is absent or represents a cyclic imide group; R, individually for each occurrence, represents a polymeric tail; and n is an integer from 1 to 20.

20 Claims, 1 Drawing Sheet

(51) Int. Cl.

| | | |
|---|---|---|
| *C10L 1/2383* | (2006.01) | |
| *C10L 10/18* | (2006.01) | |
| *C10L 1/238* | (2006.01) | |
| *C10M 149/14* | (2006.01) | |
| *C10N 30/04* | (2006.01) | |
| *C10N 40/25* | (2006.01) | |

(52) U.S. Cl.
CPC .......... *C08G 73/1082* (2013.01); *C10L 1/238* (2013.01); *C10L 1/2383* (2013.01); *C10L 10/18* (2013.01); *C10M 133/56* (2013.01); *C10M 149/14* (2013.01); *C10L 2200/0259* (2013.01); *C10L 2200/0423* (2013.01); *C10L 2200/0446* (2013.01); *C10L 2250/04* (2013.01); *C10L 2270/023* (2013.01); *C10L 2270/026* (2013.01); *C10M 2215/28* (2013.01); *C10M 2217/041* (2013.01); *C10N 2030/04* (2013.01); *C10N 2040/25* (2013.01); *C10N 2040/252* (2020.05); *C10N 2040/255* (2020.05)

(58) Field of Classification Search
CPC ......... C10L 2250/04; C10L 2200/0446; C10L 2200/0423; C10L 2200/0259; C10M 133/56; C10M 149/14; C10M 2215/28; C10M 2217/041; C10N 2230/04; C10N 2240/104; C10N 2240/10; C10N 2240/102
See application file for complete search history.

(56) References Cited

U.S. PATENT DOCUMENTS

| | | | |
|---|---|---|---|
| 5,230,817 A | | 7/1993 | Lundberg et al. |
| 5,260,404 A | * | 11/1993 | Whiteley ............... C08G 73/10 |
| | | | 528/125 |
| 5,321,096 A | | 6/1994 | Okawa et al. |
| 8,849,494 B1 | | 9/2014 | Herbach et al. |
| 2010/0160194 A1 | | 6/2010 | Harrison et al. |
| 2014/0107001 A1 | * | 4/2014 | Saccomando ........ C10M 129/72 |
| | | | 508/287 |
| 2015/0266455 A1 | | 9/2015 | Wilson |
| 2015/0344627 A1 | * | 12/2015 | Mizori .................. C08G 73/10 |
| | | | 257/632 |

OTHER PUBLICATIONS

Written Opinion of the International Searching Authority, dated Dec. 4, 2018, during the prosecution of International Application No. PCT/US2018/50526.

Written Opinion, dated Aug. 25, 2021, during the prosecution of Singapore Application No. 11202001814S.

* cited by examiner

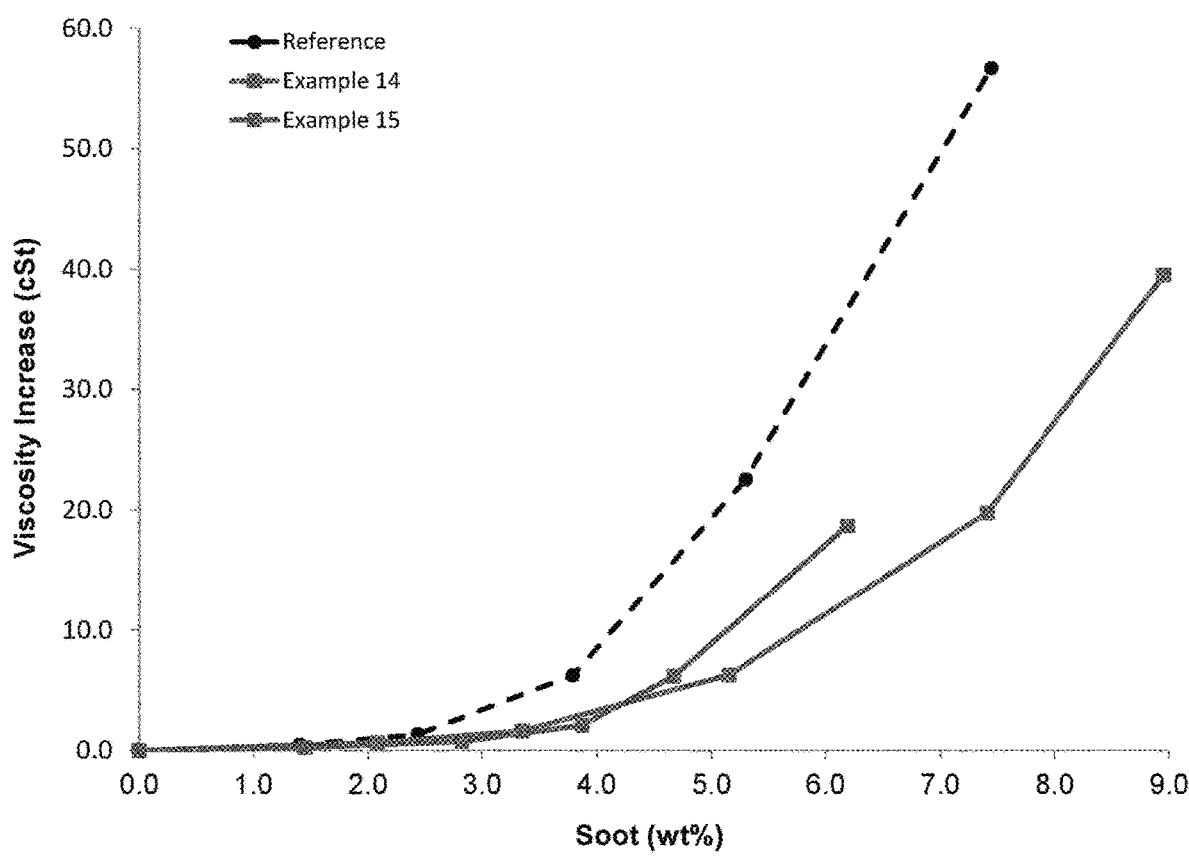

POLYIMIDE DISPERSANTS AND METHODS OF MAKING AND USING THEREOF

CROSS-REFERENCE TO RELATED APPLICATIONS

The application claims the benefit of U.S. Provisional Application No. 62/560,041, filed Sep. 18, 2017, which is hereby incorporated herein by reference in its entirety.

BACKGROUND

Lubricating motor oils intended for use in internal combustion engines are typically formulated with a variety of additives that are intended to aid in the reduction of corrosion, deposit formation, wear, etc. Ashless dispersants are a type of additive. The role of dispersants in lubricating oils is to regulate viscosity increases and prevent the formation of sludge, varnish, and other deposits, which occur due to the formation and presence of soot and other carbonaceous impurities that originate from the incomplete oxidation of fuel and that enter the base oil from the combustion chamber under normal operation of the engine. Thus, improved dispersants offer the potential to improve the performance of existing lubricating motor oils.

Likewise, it is well known that liquid fuel contains components that can degrade during engine operation and form deposits. These deposits can lead to incomplete combustion of the fuel resulting in higher emission and poorer fuel economy. Fuel additives, such as detergents, can be included in in liquid fuels to help control or minimize deposit formation. As the dynamics and mechanics of an engine continual advance, the requirements of the fuel must evolve to keep up with these engine advancements. For example, modern engines have injector systems that have smaller tolerances and operate at higher pressure to enhance fuel spray to the compression or combustion chamber. Deposit prevention and deposit reduction in these new engines has become critical to optimal operation. Advancements in fuel additive technology, such as improved detergents, are needed to keep pace with these engine advancements. Therefore, there is also need for improved detergents that can provide acceptable performance in liquid fuels and promote optimal operation of today's engines.

SUMMARY

Provided herein are polyimide compounds that include two or more cyclic imide moieties. By incorporating a plurality of cyclic imide moieties, the compounds can function as high potency dispersants. For example, in certain cases, the compounds can be used to reduce or prevent soot-induced thickening in heavy duty diesel engine oils.

For example, provided are polyimide compound defined by Formula I below

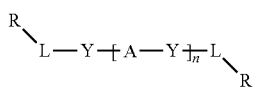

Formula I where A, individually for each occurrence, represents a cyclic diimide moiety represented by the structure below

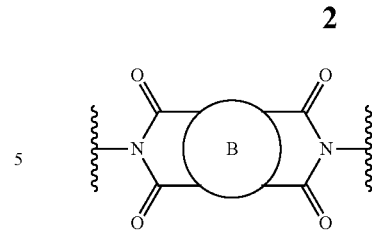

where B represents a cyclic moiety (e.g., where B comprises an aryl group) substituted with a first cyclic imide group and a second cyclic imide group; Y, individually for each occurrence, represents a bivalent linking group; L, individually for each occurrence, is absent or represents a cyclic imide group; R, individually for each occurrence, represents a polymeric tail; and n is an integer from 1 to 20 (e.g., an integer from 1-6). In certain embodiments, n can be 1.

The bivalent linking group Y can be, for example, an alkylene, heteroalkylene, cycloalkylene, heterocycloalkylene, arylene, heteroarylene, alkylarylene, alkylheteroarylene, polyalkyleneoxy, or polyalkenylamino group. In some cases, Y can comprise from 2 to 30 carbon atoms (e.g., from 6 to 30 carbon atoms, or from 6 to 12)

The polymeric tail R can be, for example, a polyolefin group, a polyetheramine group; a polyalkenylamine group; a polyalkyleneoxy group, or a combination thereof. The polymeric tail can have a molecular weight of at least 500 Da. In some cases, R can be a hydrophobic moiety. In certain embodiments, R can comprise a polyolefin group terminated by an initiator residue (e.g., a polyisobutylene group terminated by an initiator residue).

In some embodiments, the compound can be a dispersant for use in lubricating oils, and R can have a molecular weight of from 1,000 Da to 2,500 Da. In other embodiments, the compound can be an additive for use in a hydrocarbon fuel, and R can have a molecular weight of less than 1,000 Da (e.g., from 100 Da to less than 1,000 Da).

In some embodiments, the first cyclic imide group and the second cyclic imide group can each comprise a five-membered cyclic imide ring. For example, A can be chosen from one of the following

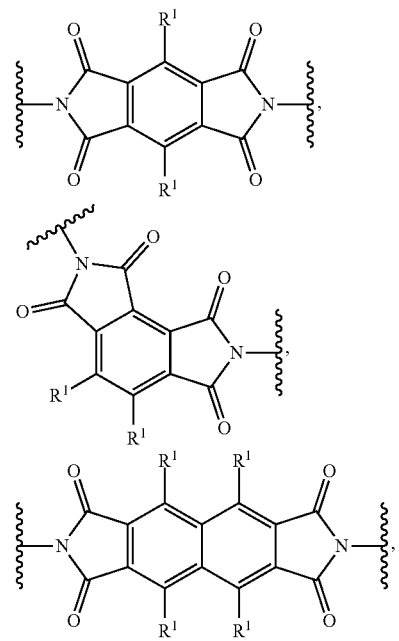

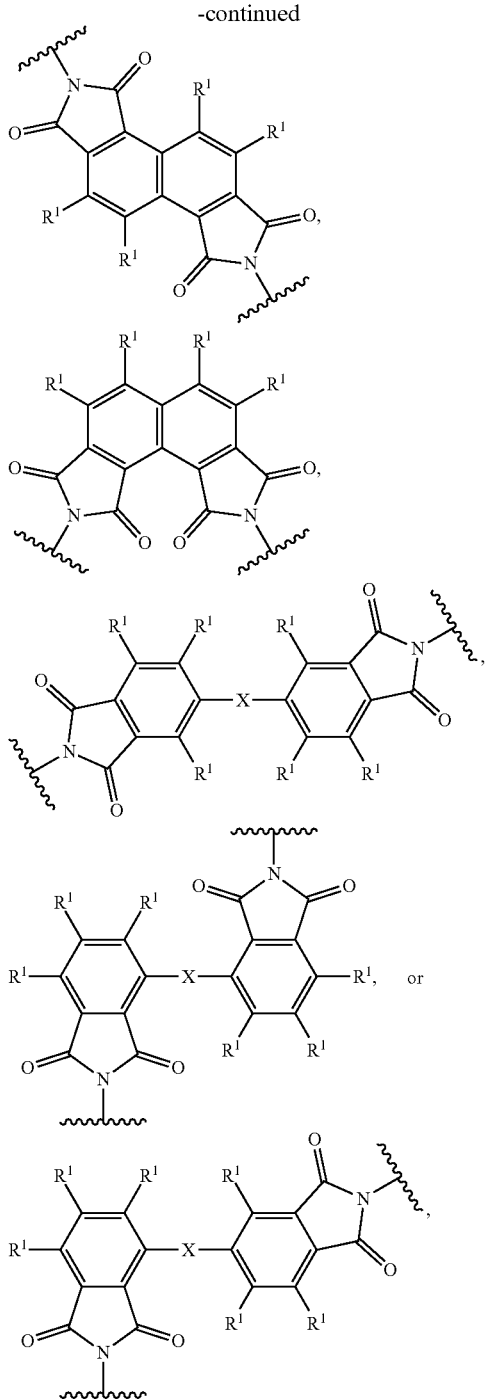

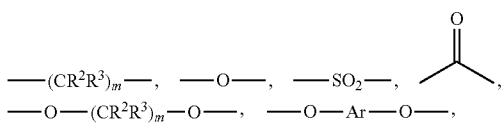

polyalkyleneoxy, or polyalkenylamino; $R^1$ represents, independently for each occurrence, H, halogen, alkyl, heteroalkyl, cycloalkyl, heterocycloalkyl, alkoxy, aryl, heteroaryl, alkylaryl, or alkylheteroaryl, or wherein permissible, two adjacent $R^1$ groups, together with the atoms to which they are attached, form a 5-8 membered substituted or unsubstituted aromatic or non-aromatic ring; $R^2$ and $R^3$ represent, independently for each occurrence, H, halogen, alkyl, heteroalkyl, cycloalkyl, heterocycloalkyl, alkoxy, aryl, heteroaryl, alkylaryl, or alkylheteroaryl; Ar represents an aryl group; and m is an integer from 1 to 12.

In other embodiments, the first cyclic imide group and the second cyclic imide group can each comprise a six-membered cyclic imide ring. For example, A can be chosen from one of the following

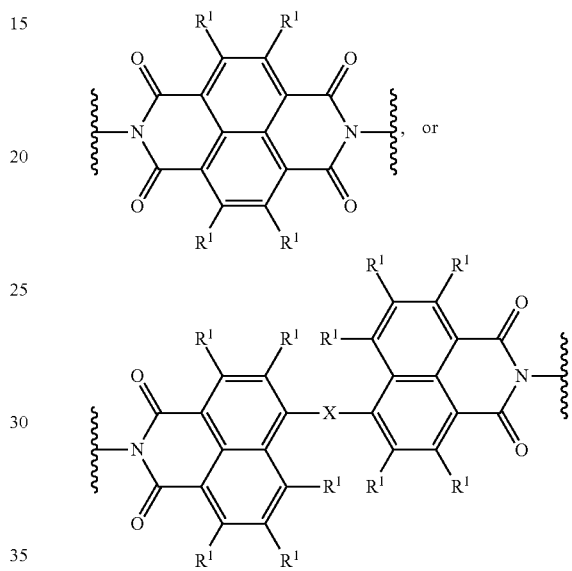

where X is absent, or represents

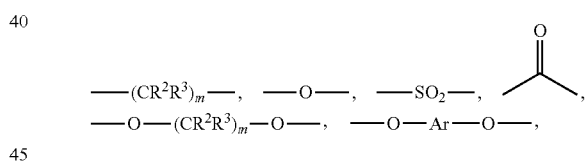

polyalkyleneoxy, or polyalkenylamino; $R^1$ represents, independently for each occurrence, H, halogen, alkyl, heteroalkyl, cycloalkyl, heterocycloalkyl, alkoxy, aryl, heteroaryl, alkylaryl, or alkylheteroaryl, or wherein permissible, two adjacent $R^1$ groups, together with the atoms to which they are attached, form a 5-8 membered substituted or unsubstituted aromatic or non-aromatic ring; $R^2$ and $R^3$ represent, independently for each occurrence, H, halogen, alkyl, heteroalkyl, cycloalkyl, heterocycloalkyl, alkoxy, aryl, heteroaryl, alkylaryl, or alkylheteroaryl; Ar represents an aryl group; and m is an integer from 1 to 12.

In some embodiments, L can be absent. For example, in some cases, the polyimide compound can be defined by Formula IA below

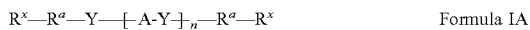 Formula IA where A and n are as defined above with respect to Formula I, $R^x$ is an initiator residue; and $R^a$ is a polyolefin group (e.g., $R^a$ comprises a polyisobutylene group).

In other embodiments, L can be present. For example, L can be, in all occurrences, a five-membered cyclic imide ring. In some of these cases, the polyimide compound can be defined by Formula IB below

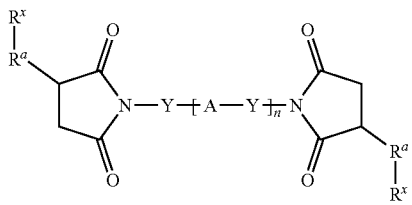

Formula IB where A, Y, and n are as defined above with respect to Formula I, $R^x$ is an initiator residue; and $R^a$ is a polyolefin group (e.g., $R^a$ comprises a polyisobutylene group).

Also provided are methods of preparing the polyimide compounds described herein. For example, methods for preparing a polyimide compounds can comprise (a) providing a polymeric tail precursor comprising a terminal anhydride moiety (e.g., polyisobutenyl succinic anhydride (PIBSA)); and (b) condensing the polymeric tail precursor with a bivalent linker and a tetracarboxylate, an ester thereof, an acid halide thereof, or a cyclic dianhydride thereof to form the polyimide compound.

The bivalent linker can be a compound defined by the formula

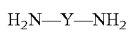

where Y is chosen from alkylene, heteroalkylene, cycloalkylene, heterocycloalkylene, arylene, heteroarylene, alkylarylene, alkylheteroarylene, polyalkyleneoxy, or polyalkenylamino.

In some embodiments, step (b) can comprise condensing the polymeric tail precursor with a bivalent linker and a cyclic dianhydride. The cyclic dianhydride can, in some cases, be chosen from one of the following

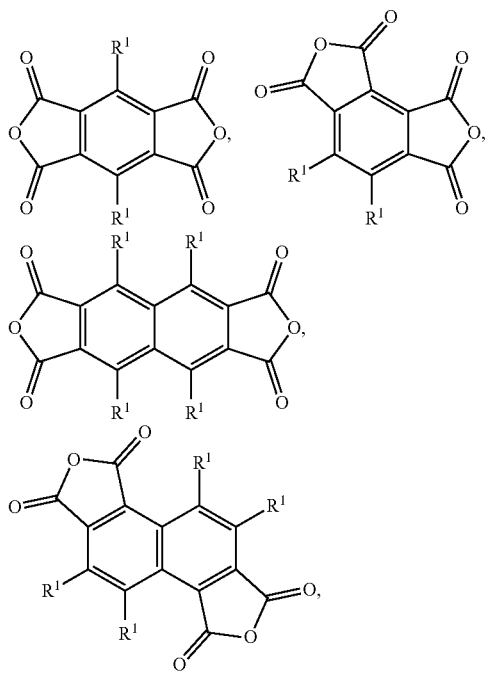

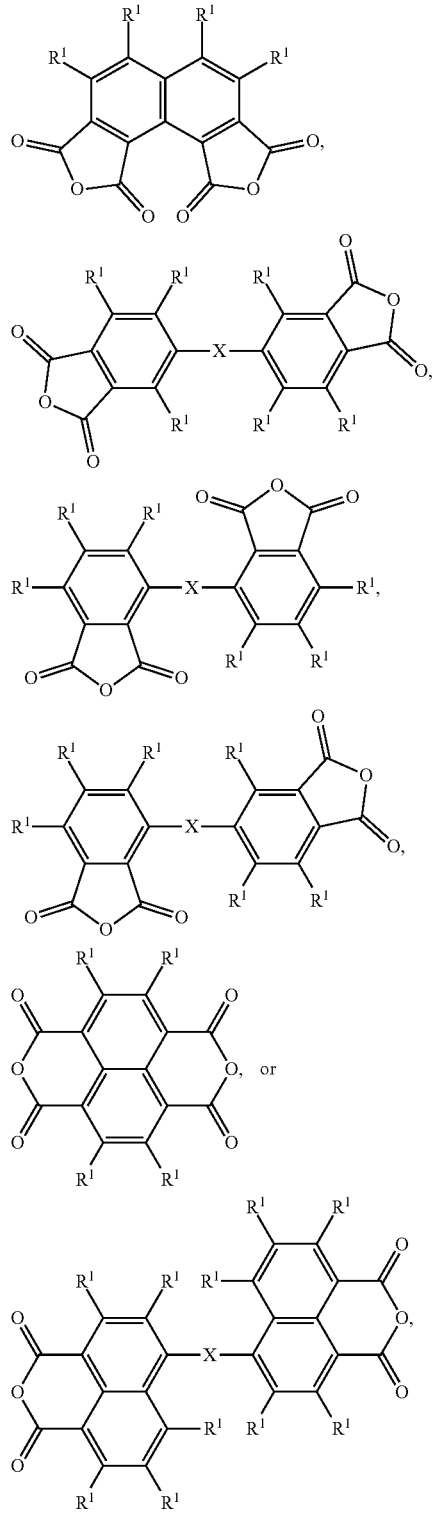

where X is absent, or represents

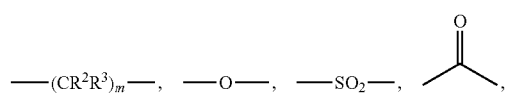

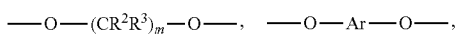

polyalkyleneoxy, or polyalkenylamino; R¹ represents, independently for each occurrence, H, halogen, alkyl, heteroalkyl, cycloalkyl, heterocycloalkyl, alkoxy, aryl, heteroaryl, alkylaryl, or alkylheteroaryl, or wherein permissible, two adjacent R¹ groups, together with the atoms to which they are attached, form a 5-8 membered substituted or unsubstituted aromatic or non-aromatic ring; R² and R³ represent, independently for each occurrence, H, halogen, alkyl, heteroalkyl, cycloalkyl, heterocycloalkyl, alkoxy, aryl, heteroaryl, alkylaryl, or alkylheteroaryl; Ar represents an aryl group; and m is an integer from 1 to 12.

In some embodiments, step (b) can comprise combining the polymeric tail precursor, the bivalent linker, and the tetracarboxylate, an ester thereof, an acid halide thereof, or a cyclic dianhydride thereof to form a reaction mixture, and heating the reaction mixture to a temperature of at least 100° C. (e.g., a temperature of from 120° C. to 200° C.). Optionally, step (b) can comprise removing water from the reaction mixture to drive formation of the polyimide compound.

Also provided herein are methods for preparing a polyimide compound, the method comprising (a) providing a polymeric tail precursor comprising a terminal amine moiety (e.g., polyisobutylene amine (PIBA)); and (b) condensing the polymeric tail precursor with a tetracarboxylate, an ester thereof, an acid halide thereof, or a cyclic dianhydride thereof to form the polyimide compound.

In some embodiments, step (b) can comprise condensing the polymeric tail precursor with a cyclic dianhydride. The cyclic dianhydride can, in some cases, be chosen from one of the following

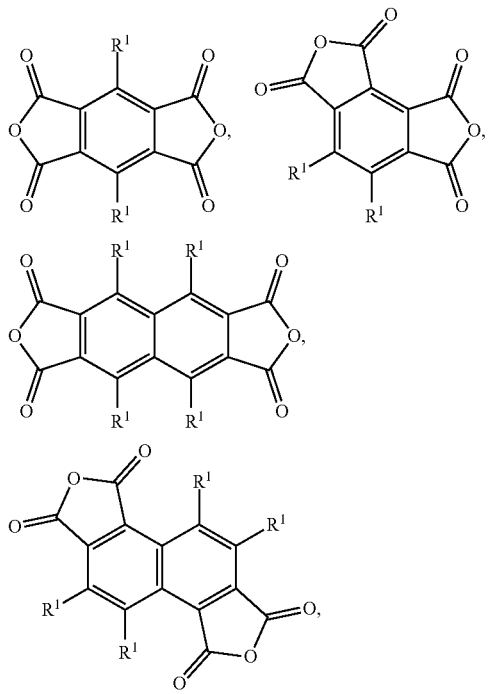

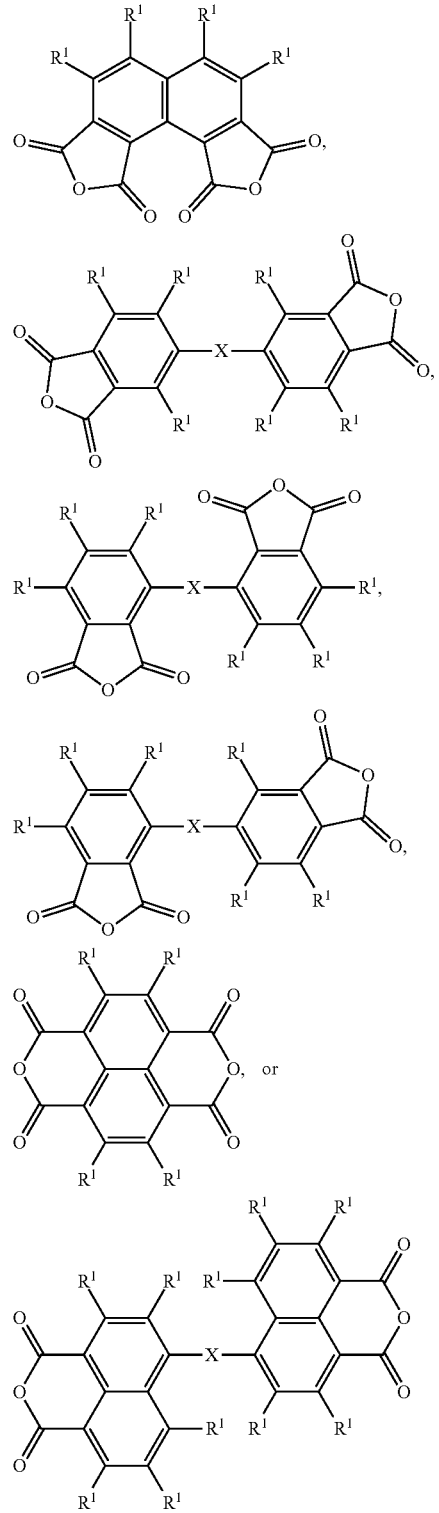

where X is absent, or represents

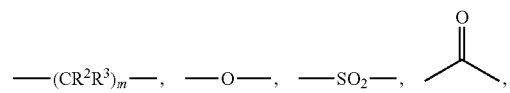

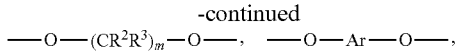

polyalkyleneoxy, or polyalkenylamino; $R^1$ represents, independently for each occurrence, H, halogen, alkyl, heteroalkyl, cycloalkyl, heterocycloalkyl, alkoxy, aryl, heteroaryl, alkylaryl, or alkylheteroaryl, or wherein permissible, two adjacent $R^1$ groups, together with the atoms to which they are attached, form a 5-8 membered substituted or unsubstituted aromatic or non-aromatic ring; $R^2$ and $R^3$ represent, independently for each occurrence, H, halogen, alkyl, heteroalkyl, cycloalkyl, heterocycloalkyl, alkoxy, aryl, heteroaryl, alkylaryl, or alkylheteroaryl; Ar represents an aryl group; and m is an integer from 1 to 12.

In some embodiments, step (b) can comprise condensing the polymeric tail precursor and the tetracarboxylate, an ester thereof, an acid halide thereof, or a cyclic dianhydride thereof with a bivalent linker. The bivalent linker can be a compound defined by the formula

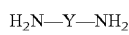

where Y is chosen from alkylene, heteroalkylene, cycloalkylene, heterocycloalkylene, arylene, heteroarylene, alkylarylene, alkylheteroarylene, polyalkyleneoxy, or polyalkenylamino.

In some embodiments, step (b) can comprise combining the polymeric tail precursor, the tetracarboxylate, an ester thereof, an acid halide thereof, or a cyclic dianhydride thereof, and the bivalent linker, when present to form a reaction mixture, and heating the reaction mixture to a temperature of at least 100° C. (e.g., a temperature of from 120° C. to 200° C.). Optionally, step (b) can comprise removing water from the reaction mixture to drive formation of the polyimide compound.

Also provided are methods for preparing a polyimide compound that comprise (a) generating a quasiliving polyolefin in a reversible deactivation-type living polymerization; (b) adding to the reversible deactivation-type living polymerization of step (a) a quenching agent to generate a quenched precursor; (c) reacting the quenched precursor to form an amine-capped polymeric tail precursor; and (d) condensing the amine-capped polymeric tail precursor with a tetracarboxylate, an ester thereof, an acid halide thereof, or a cyclic dianhydride thereof to form the polyimide compound.

Step (a) can comprise combining a Lewis acid and a monomer (e.g., isobutylene) with an initiator in the presence of an electron donor, common ion salt, common ion salt precursor, or combination thereof. In some cases, step (b) is performed after high conversion of the monomer has occurred.

Step (d) can comprise condensing the amine-capped polymeric tail precursor with a cyclic dianhydride. The cyclic dianhydride can, in some cases, be chosen from one of the following

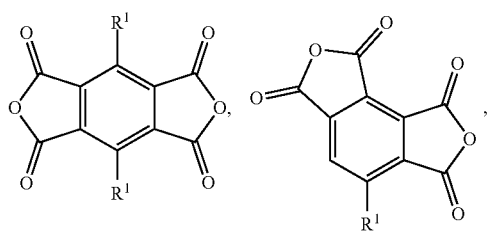

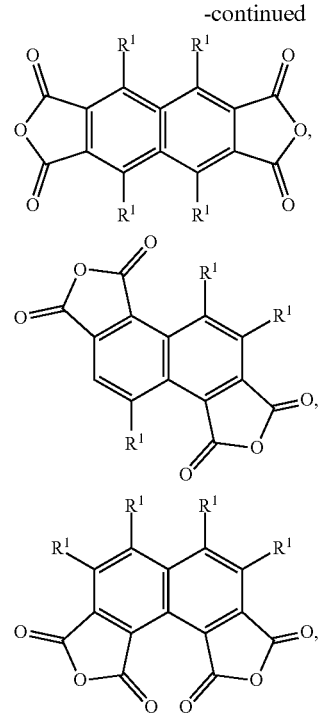

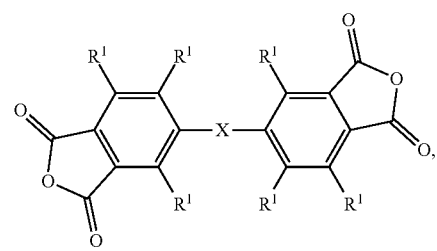

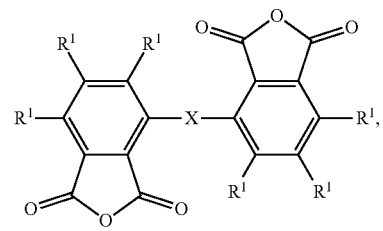

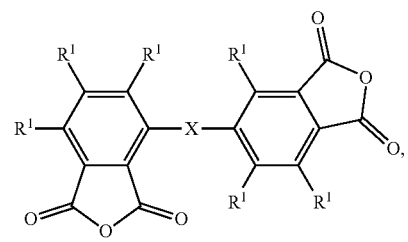

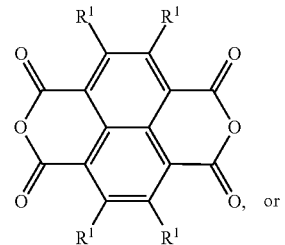

-continued

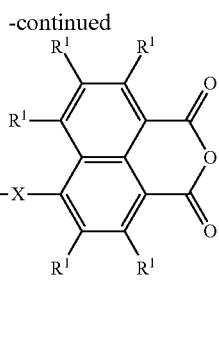

where X is absent, or represents

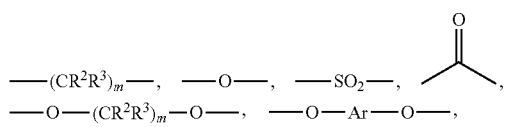

polyalkyleneoxy, or polyalkenylamino; $R^1$ represents, independently for each occurrence, H, halogen, alkyl, heteroalkyl, cycloalkyl, heterocycloalkyl, alkoxy, aryl, heteroaryl, alkylaryl, or alkylheteroaryl, or wherein permissible, two adjacent $R^1$ groups, together with the atoms to which they are attached, form a 5-8 membered substituted or unsubstituted aromatic or non-aromatic ring; $R^2$ and $R^3$ represent, independently for each occurrence, H, halogen, alkyl, heteroalkyl, cycloalkyl, heterocycloalkyl, alkoxy, aryl, heteroaryl, alkylaryl, or alkylheteroaryl; Ar represents an aryl group; and m is an integer from 1 to 12.

In some embodiments, step (d) can comprise condensing the amine-capped polymeric tail precursor and the tetracarboxylate, an ester thereof, an acid halide thereof, or a cyclic dianhydride thereof with a bivalent linker. The bivalent linker can be a compound defined by the formula $H_2N$—Y—$NH_2$ where Y is chosen from alkylene, heteroalkylene, cycloalkylene, heterocycloalkylene, arylene, heteroarylene, alkylarylene, alkylheteroarylene, polyalkyleneoxy, or polyalkenylamino.

In some embodiments, step (d) can comprise combining the amine-capped polymeric tail precursor, the tetracarboxylate, an ester thereof, an acid halide thereof, or a cyclic dianhydride thereof, and the bivalent linker, when present to form a reaction mixture, and heating the reaction mixture to a temperature of at least 100° C. (e.g., a temperature of from 120° C. to 200° C.). Optionally, step (d) can comprise removing water from the reaction mixture to drive formation of the polyimide compound.

Also provided herein are polyimide compounds prepared by the methods described herein.

DESCRIPTION OF DRAWINGS

FIG. 1 is plot showing the percent increase in the viscosity of two example lubricating oil compositions containing polyimide dispersants described herein as a function of weight percent of soot in the oil during a Peugeot DV4TD screener engine test. The values obtained using the polyimide dispersants described herein were plotted against a reference lubricating oil composition containing a conventional dispersant (ethylene carbonate post-treated PIB succinimide). The lubricating oil compositions containing polyimide dispersants described herein exhibited a lower viscosity increase with increasing soot level than the reference lubricating oil composition, indicating improved dispercancy.

DETAILED DESCRIPTION

Definitions

To facilitate understanding of the disclosure set forth herein, a number of terms are defined below. Unless defined otherwise, all technical and scientific terms used herein generally have the same meaning as commonly understood by one of ordinary skill in the art to which this disclosure belongs. The organic moieties mentioned when defining variable positions within the general formulae described herein (e.g., the term "halogen") are collective terms for the individual substituents (e.g., fluorine, chlorine, bromine, iodine, etc.) encompassed by the organic moiety. The prefix $C_n$-$C_m$ preceding a group or moiety indicates, in each case, the possible number of carbon atoms in the group or moiety that follows.

As used herein, the term "alkyl" refers to saturated, straight-chained or branched saturated hydrocarbon moieties. Unless otherwise specified, $C_1$-$C_8$ (e.g., $C_1$-$C_6$, or $C_1$-$C_4$) alkyl groups are intended. Examples of alkyl groups include methyl, ethyl, propyl, 1-methyl-ethyl, butyl, 1-methyl-propyl, 2-methyl-propyl, 1,1-dimethyl-ethyl, pentyl, 1-methyl-butyl, 2-methyl-butyl, 3-methyl-butyl, 2,2-dimethyl-propyl, 1-ethyl-propyl, hexyl, 1,1-dimethyl-propyl, 1,2-dimethyl-propyl, 1-methyl-pentyl, 2-methyl-pentyl, 3-methyl-pentyl, 4-methyl-pentyl, 1,1-dimethyl-butyl, 1,2-dimethyl-butyl, 1,3-dimethyl-butyl, 2,2-dimethyl-butyl, 2,3-dimethyl-butyl, 3,3-dimethyl-butyl, 1-ethyl-butyl, 2-ethyl-butyl, 1,1,2-trimethyl-propyl, 1,2,2-trimethyl-propyl, 1-ethyl-1-methyl-propyl, and 1-ethyl-2-methyl-propyl. Alkyl substituents may be unsubstituted or substituted with one or more chemical moieties. The alkyl group can be substituted with one or more groups including, but not limited to, hydroxy, halogen, acyl, alkyl, alkoxy, alkenyl, alkynyl, aryl, heteroaryl, acyl, aldehyde, amino, carboxylic acid, ester, ether, ketone, nitro, silyl, sulfo-oxo, sulfonyl, sulfone, sulfoxide, or thiol, as described below, provided that the substituents are sterically compatible and the rules of chemical bonding and strain energy are satisfied.

Throughout the specification "alkyl" is generally used to refer to both unsubstituted alkyl groups and substituted alkyl groups; however, substituted alkyl groups can also specifically referred to herein by identifying the specific substituent(s) on the alkyl group. For example, the term "alkylaryl" can be used to specifically refers to an alkyl group that is substituted with one or more aryl groups (e.g., phenyl groups). When "alkyl" is used in one instance and a specific term such as "alkylaryl" is used in another, it is not meant to imply that the term "alkyl" does not also refer to specific terms such as "alkylaryl" and the like.

As used herein, the term "alkoxy" refers to a group of the formula $Z^1$—O—, where $Z^1$ is unsubstituted or substituted alkyl as defined above. Unless otherwise specified, alkoxy groups wherein $Z^1$ is a $C_1$-$C_8$ (e.g., $C_1$-$C_6$, $C_1$-$C_4$) alkyl group are intended. Examples include methoxy, ethoxy, propoxy, 1-methyl-ethoxy, butoxy, 1-methyl-propoxy, 2-methyl-propoxy, 1,1-dimethyl-ethoxy, pentoxy, 1-methyl-butyloxy, 2-methyl-butoxy, 3-methyl-butoxy, 2,2-di-methyl-propoxy, 1-ethyl-propoxy, hexoxy, 1,1-dimethyl-propoxy, 1,2-dimethyl-propoxy, 1-methyl-pentoxy, 2-methyl-pentoxy, 3-methyl-pentoxy, 4-methyl-penoxy, 1,1-dimethyl-butoxy, 1,2-dimethyl-butoxy, 1,3-dimethyl-butoxy, 2,2-dimethyl-butoxy, 2,3-dimethyl-butoxy, 3,3-dimethyl-butoxy, 1-ethyl-butoxy, 2-ethylbutoxy, 1,1,2-trimethyl-propoxy, 1,2,2-trimethyl-propoxy, 1-ethyl-1-methyl-propoxy, and 1-ethyl-2-methyl-propoxy.

As used herein, the term "aryl" refers to groups that include a monovalent aromatic carbocyclic group of from 3 to 20 carbon atoms. Aryl groups can include a single ring or multiple condensed rings. In some embodiments, aryl groups include $C_6$-$C_{10}$ aryl groups. Examples of aryl groups include, but are not limited to, phenyl, biphenyl, naphthyl, tetrahydronaphthyl, phenylcyclopropyl, and indanyl. In some embodiments, the aryl group can be a phenyl, indanyl or naphthyl group. Aryl substituents may be unsubstituted or substituted with one or more chemical moieties. Examples of suitable substituents include, for example, alkyl, halogenated alkyl, alkoxy, alkenyl, alkynyl, aryl, heteroaryl, acyl, aldehyde, amino, carboxylic acid, cycloalkyl, ester, ether, halide, hydroxy, ketone, nitro, silyl, sulfo-oxo, sulfonyl, sulfone, sulfoxide, or thiol.

As used herein, the term "cycloalkyl" refers to a non-aromatic carbon-based ring composed of at least three carbon atoms. Examples of cycloalkyl groups include, but are not limited to, cyclopropyl, cyclobutyl, cyclopentyl, cyclohexyl, etc. The term "heterocycloalkyl" is a cycloalkyl group as defined above where at least one of the carbon atoms of the ring is substituted with a heteroatom such as, but not limited to, nitrogen, oxygen, sulfur, or phosphorus. The cycloalkyl group and heterocycloalkyl group can be substituted or unsubstituted. The cycloalkyl group and heterocycloalkyl group can be substituted with one or more groups including, but not limited to, alkyl, alkoxy, alkenyl, alkynyl, aryl, heteroaryl, acyl, aldehyde, amino, carboxylic acid, ester, ether, halide, hydroxy, ketone, nitro, silyl, sulfo-oxo, sulfonyl, sulfone, sulfoxide, or thiol.

As used herein, the term "imide" refers to a chemical moiety that includes two acyl groups bound to nitrogen, as shown in the general formula below.

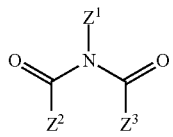

Imide moieties can be linear or cyclic. In the case of cyclic imides, $Z^2$ and $Z^3$, together with the atoms to which they are attached, form a five, six, seven, or eight membered ring. This ring may be unsubstituted or substituted with one or more chemical moieties. Examples of suitable substituents include, for example, alkyl, halogenated alkyl, alkoxy, alkenyl, alkynyl, aryl, heteroaryl, acyl, aldehyde, amino, carboxylic acid, cycloalkyl, ester, ether, halide, hydroxy, ketone, nitro, silyl, sulfo-oxo, sulfonyl, sulfone, sulfoxide, or thiol. This ring may also be annulated with one or more cycloalkyl, aryl, or heteroaryl rings, such that $Z^2$ and $Z^3$, together with the atoms to which they are attached, form a five, six, seven, or eight membered ring that is fused to one or more additional cyclic moieties.

As used herein, the term "initiator" refers to a compound capable of providing one or more carbocations, in one embodiment, one, two, or three carbocations, to which a monomer (e.g., olefin or isobutylene) or a comonomer may add during a carbocationic polymerization.

As used herein, the term "mono-functional initiator" refers to an initiator that provides approximately one stoichiometric equivalent of carbocation relative to initiator. When a mono-functional initiator is used, the chain-end concentration is approximately equal to the initiator concentration.

As used herein, the term "multi-functional initiator" refers to an initiator that provides approximately x stoichiometric equivalents of carbocation relative to initiator, wherein x represents the functionality of the initiator. When a multi-functional initiator is used, when the functionality of the initiator equals x, then the chain-end concentration equals x times the initiator concentration. In some embodiments, x is 2, and the initiator is a bi-functional initiator.

As used herein, the term "initiator residue" refers to a monovalent, divalent, or polyvalent moiety that is bonded to one, two, or more polymer groups. In certain embodiments, the initiator residue is derived from an initiator. In certain embodiments, the initiator residue is the portion of an initiator that remains after forming one, two, or more carbocations and reacting with a monomer or comonomer during a polymerization.

As used herein, the term "monomer" refers to a compound that is capable of forming one of the two or more repetitive units of a polymer. In certain embodiments, the monomer is an olefin. In certain embodiments, the monomer is isobutene.

As used herein, the terms "polyolefin" and "polyolefin group" refer to a polymer or oligomer that comprises two or more monomeric units derived from an olefin. In certain embodiments, the polyolefin is polyethylene, polypropylene, polyisobutylene, or polystyrene. In certain embodiments, the polyolefin is a homopolyolefin. In certain embodiments, the polyolefin is a polyolefin copolymer. In some embodiments, the polyolefin has a molecular weight from about 300 to in excess of a million g/mol. In some embodiments, the polyolefin has a molecular weight of from about 200 to 10,000 g/mol. In some embodiments, the polyolefin has a molecular weight of from about 1,000 to 5,000 g/mol. In some embodiments, the polyolefin has a molecular weight of from about 2,000 to 3,000 g/mol. In some embodiments, the polyolefin has a molecular weight of from about 100,000 to 1,000,000 g/mol. In some embodiments, the polyolefin has a molecular weight greater than 200 g/mol. In some embodiments, the polyolefin has a molecular weight greater than 400 g/mol. In some embodiments, the polyolefin has a molecular weight greater than 600 g/mol. In some embodiments, the polyolefin has a molecular weight greater than 800 g/mol. In some embodiments, the polyolefin has a molecular weight greater than 1,000 g/mol. In some embodiments, the polyolefin has a molecular weight greater than 5,000 g/mol. In some embodiments, the polyolefin has a molecular weight greater than 10,000 g/mol. In some embodiments, the polyolefin has a molecular weight greater than 100,000 g/mol. In some embodiments, the polyolefin has a molecular weight greater than 500,000 g/mol. In some embodiments, the polyolefin has a molecular weight greater than 1,000,000 g/mol. In some embodiments, the polyolefin is derived from a mono-functional initiator, bi-functional initiator, or multi-functional initiator. In some embodiments, the polyolefin is polyisobutene.

As used herein, the terms "polyisobutylene," "polyisobutylene group," and "PIB" refer to a polymer comprising two or more monomeric isobutylene units. In certain embodiments, the polyisobutylene comprises an initiator residue. In certain embodiments, the polyisobutylene is a homopolyisobutylene. In certain embodiments, the polyisobutylene is a polyisobutylene copolymer.

As used herein, the term "quasiliving polyolefin" refers to a polyolefin that has been formed using a reversible deactivation-type living polymerization. In some embodiments, the quasiliving polyolefin can be a quasiliving carbocationic polyolefin.

As used herein, the term "reversible deactivation-type living polymerization" refers to a polymerization process that proceeds with minimal irreversible chain termination and minimal chain transfer. Such polymerizations proceed by initiation followed by propagation, wherein propagating (active) species are in equilibrium with non-propagating (dormant) polymer chains. In some embodiments, the reversible deactivation-type living polymerization can be a reversible deactivation-type living carbocationic polymerization, also referred to as a quasiliving carbocationic polymerization.

As used herein, the term "terminator" refers to a compound that deactivates a Lewis acid.

As used herein, the term "Lewis acid" refers to a chemical entity that is capable of accepting a pair of electrons.

Polyimide Compounds

Provided herein are polyimide compounds that include two or more (e.g., from 2 to 40, from 2 to 20, from 4 to 20, from 2 to 16, from 4 to 16, from 2 to 12, from 4 to 12, from 2 to 8, or from 4 to 8) cyclic imide moieties. By incorporating a plurality of cyclic imide moieties, the compounds can function as high potency dispersants. For example, in certain cases, the compounds can be used to reduce or prevent soot-induced thickening in diesel engine oils, including heavy duty diesel engine oils.

For example, provided are polyimide compound defined by Formula I below

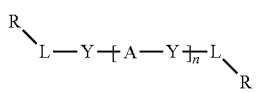

Formula I where A, individually for each occurrence, represents a cyclic diimide moiety represented by the structure below

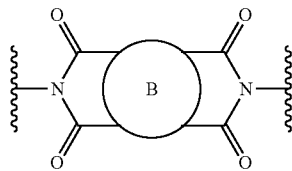

where B represents a cyclic moiety (e.g., an aryl group) substituted with a first cyclic imide group and a second cyclic imide group; Y, individually for each occurrence, represents a bivalent linking group; L, individually for each occurrence, is absent or represents a cyclic imide group; R, individually for each occurrence, represents a polymeric tail; and n is an integer from 1 to 20 (e.g., an integer from 1-6). In certain embodiments, n can be 1.

The bivalent linking group Y can be, for example, an alkylene, heteroalkylene, cycloalkylene, heterocycloalkylene, arylene, heteroarylene, alkylarylene, alkylheteroarylene, polyalkyleneoxy, or polyalkenylamino group. In some embodiments, Y can comprise from 2 to 30 carbon atoms (e.g., from 4 to 30 carbon atoms, from 6 to 30 carbon atoms, from 6 to 20 carbon atoms, from 6 to 15 carbon atoms, or from 6 to 10 carbon atoms).

In some embodiments, Y can be $-(CR^2R^3)_m-$ where $R^2$ and $R^3$ represent, independently for each occurrence, H, halogen, alkyl, heteroalkyl, cycloalkyl, heterocycloalkyl, alkoxy, aryl, heteroaryl, alkylaryl, or alkylheteroaryl; and m is an integer from 1 to 12 (e.g., an integer from 1 to 10, an integer from 1 to 8, an integer from 1 to 6, or an integer from 1 to 4).

In some embodiments, Y can be one of the following

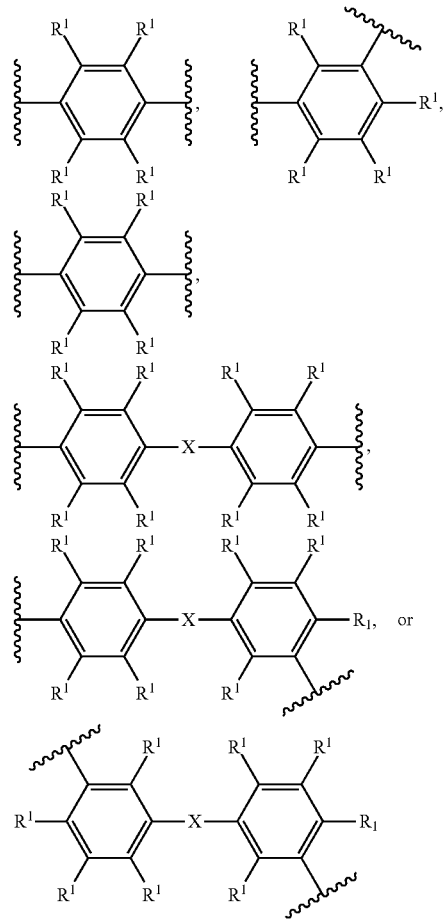

where X is absent, or represents

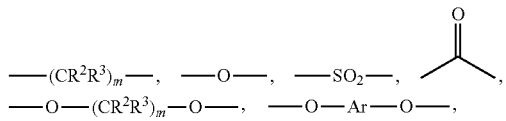

polyalkyleneoxy, or polyalkenylamino; $R^1$ represents, independently for each occurrence, H, halogen, alkyl, heteroalkyl, cycloalkyl, heterocycloalkyl, alkoxy, aryl, heteroaryl, alkylaryl, or alkylheteroaryl, or wherein permissible, two adjacent $R^1$ groups, together with the atoms to which they are attached, form a 5-8 membered substituted or unsubstituted aromatic or non-aromatic ring; $R^2$ and $R^3$ represent, independently for each occurrence, H, halogen, alkyl, heteroalkyl, cycloalkyl, heterocycloalkyl, alkoxy, aryl, heteroaryl, alkylaryl, or alkylheteroaryl; Ar represents an aryl group; and m is an integer from 1 to 12. In some embodiments, m can be an integer from 1 to 10 (e.g., an integer from 1 to 10, an integer from 1 to 8, an integer from 1 to 6, or an integer from 1 to 4).

The polymeric tail R can be, for example, a polyolefin group, a polyetheramine group; a polyalkenylamine group; a polyalkyleneoxy group (also referred to as a polyoxyalkylene group), or a combination thereof. In some cases, R can be a hydrophobic moiety. In certain embodiments, R can comprise a polyolefin group terminated by an initiator residue (e.g., a polyisobutylene group terminated by an initiator residue).

In some embodiments, the compound can be a dispersant for use in lubricating oils, and R can have a molecular weight of from 1,000 Da to 2,500 Da (e.g., from 1,000 Da to 2,000 Da; from 1,500 Da to 2,500 Da, from 1,500 Da to 2,000 Da, from 2,000 Da to 2,500 Da). In other embodiments, the compound can be an additive for use in a hydrocarbon fuel, and R can have a molecular weight of less than 1,000 Da (e.g., from 100 Da to less than 1,000 Da; from 200 Da to 900 Da, from 100 Da to 500 Da, from 500 Da to less than 1,000 Da, from 250 Da to less than 1,000 Da, or from 750 to less than 1,000 Da).

In some embodiments, the first cyclic imide group and the second cyclic imide group can each comprise a five-membered cyclic imide ring. For example, A can be chosen from one of the following

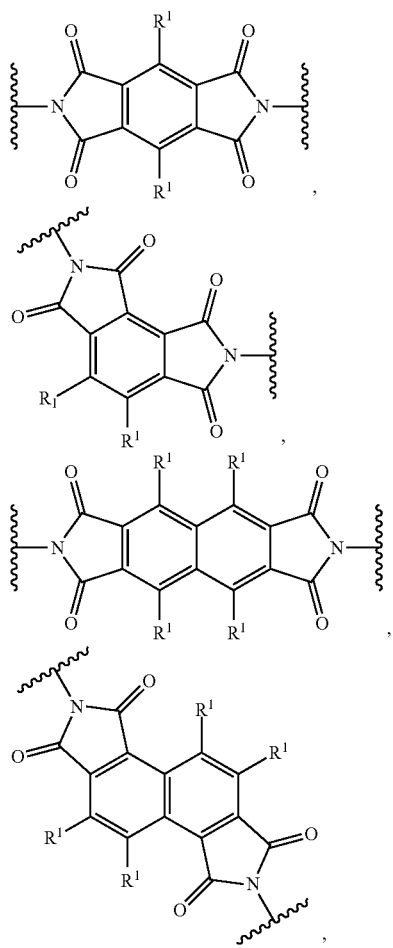

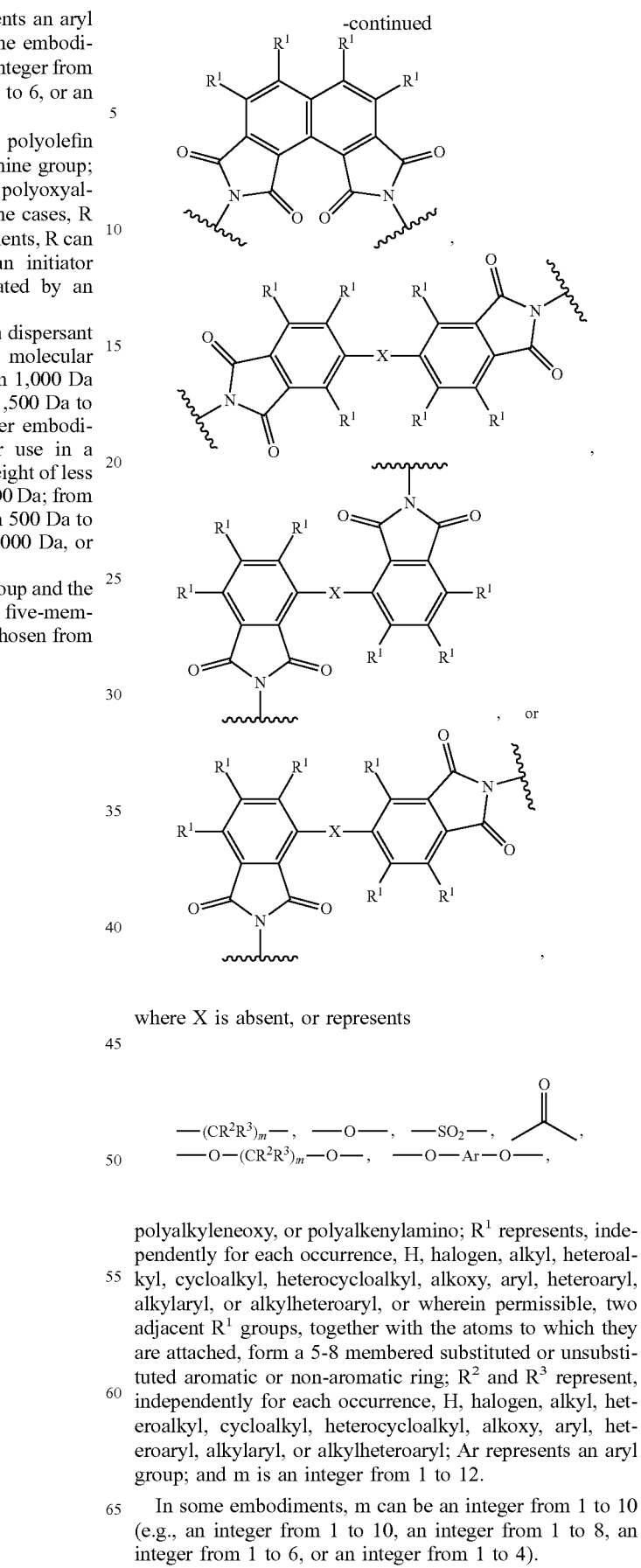

where X is absent, or represents $-(CR^2R^3)_m-$, $-O-$, $-SO_2-$, [ketone structure], $-O-(CR^2R^3)_m-O-$, $-O-Ar-O-$, polyalkyleneoxy, or polyalkenylamino; $R^1$ represents, independently for each occurrence, H, halogen, alkyl, heteroalkyl, cycloalkyl, heterocycloalkyl, alkoxy, aryl, heteroaryl, alkylaryl, or alkylheteroaryl, or wherein permissible, two adjacent $R^1$ groups, together with the atoms to which they are attached, form a 5-8 membered substituted or unsubstituted aromatic or non-aromatic ring; $R^2$ and $R^3$ represent, independently for each occurrence, H, halogen, alkyl, heteroalkyl, cycloalkyl, heterocycloalkyl, alkoxy, aryl, heteroaryl, alkylaryl, or alkylheteroaryl; Ar represents an aryl group; and m is an integer from 1 to 12.

In some embodiments, m can be an integer from 1 to 10 (e.g., an integer from 1 to 10, an integer from 1 to 8, an integer from 1 to 6, or an integer from 1 to 4).

In other embodiments, the first cyclic imide group and the second cyclic imide group can each comprise a six-membered cyclic imide ring. For example, A can be chosen from one of the following

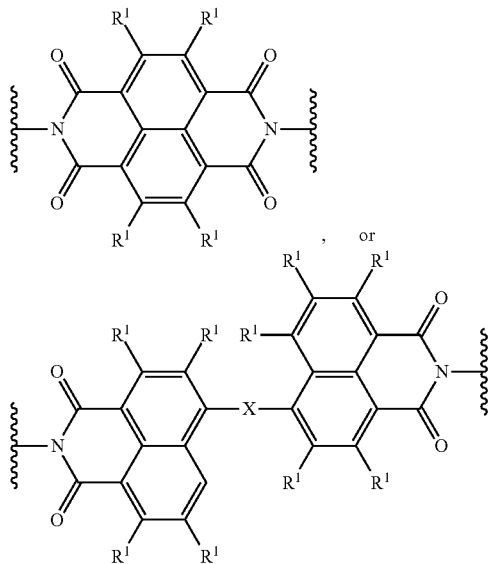

where X is absent, or represents

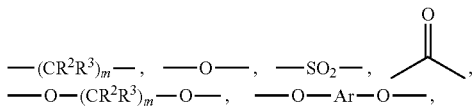

polyalkyleneoxy, or polyalkenylamino; $R^1$ represents, independently for each occurrence, H, halogen, alkyl, heteroalkyl, cycloalkyl, heterocycloalkyl, alkoxy, aryl, heteroaryl, alkylaryl, or alkylheteroaryl, or wherein permissible, two adjacent $R^1$ groups, together with the atoms to which they are attached, form a 5-8 membered substituted or unsubstituted aromatic or non-aromatic ring; $R^2$ and $R^3$ represent, independently for each occurrence, H, halogen, alkyl, heteroalkyl, cycloalkyl, heterocycloalkyl, alkoxy, aryl, heteroaryl, alkylaryl, or alkylheteroaryl; Ar represents an aryl group; and m is an integer from 1 to 12.

In some embodiments, m can be an integer from 1 to 10 (e.g., an integer from 1 to 8, an integer from 1 to 6, or an integer from 1 to 4).

In some embodiments, L can be absent. For example, in some cases, the polyimide compound can be defined by Formula IA below

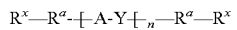    Formula IA where A and n are as defined above with respect to Formula I, $R^x$ is an initiator residue; and $R^a$ is a polyolefin group (e.g., $R^a$ comprises a polyisobutylene group).

In other embodiments, L can be present. For example, L can be, in all occurrences, a five-membered cyclic imide ring. In some of these cases, the polyimide compound can be defined by Formula IB below

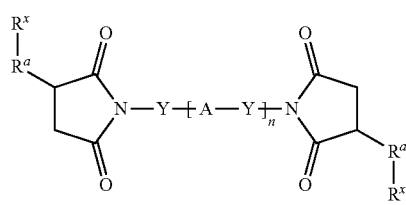    Formula IB where A, Y, and n are as defined above with respect to Formula I, $R^x$ is an initiator residue; and $R^a$ is a polyolefin group (e.g., $R^a$ comprises a polyisobutylene group).

Lubricating Oil Compositions

As discussed above, the polyimide compounds described herein can be used as detergent and dispersant additives in lubricating oils. When employed in this manner, the polyimide compounds are usually present in the lubricant oil composition in an amount of from 0.2 to 10 percent by weight (e.g., from 0.5 to 8 percent by weight, or from 1 to 6 percent by weight), based on the total weight of the lubricant oil composition. The lubricating oil in these compositions may be, for example, mineral oil or synthetic oils of lubricating viscosity. In certain embodiments, the lubricating oil can be an oil that is suitable for use in the crankcase of an internal combustion engine. Crankcase lubricating oils ordinarily have a viscosity of about 1300 CSt 0° F. to 22.7 CSt at 210° F. (99° C.). The lubricating oils may be derived from synthetic or natural sources. Mineral oil for use as the base oil can include paraffinic, naphthenic and other oils that are ordinarily used in lubricating oil compositions. Synthetic oils include both hydrocarbon synthetic oils and synthetic esters. Useful synthetic hydrocarbon oils include liquid polymers of alpha olefins having the proper viscosity. Especially useful are the hydrogenated liquid oligomers of $C_6$ to $C_{12}$ alpha olefins such as 1-decene trimer. Likewise, alkyl benzenes of proper viscosity, such as didodecyl benzene, can be used. Blends of hydrocarbon oils with synthetic oils are also useful.

Also provided are lubricating oil concentrates. The concentrates can include from 90 to 10 weight percent, (e.g., from 90 to 50 weight percent) of an oil of lubricating viscosity, based on the total weight of the concentrate composition, and from 10 to 90 weight percent (e.g., from 10 to 50 weight percent), of polyimide described herein, based on the total weight of the concentrate composition. Typically, the concentrates contain sufficient diluent to make them easy to handle during shipping and storage. Suitable diluents for the concentrates include any inert diluent, preferably an oil of lubricating viscosity, such that the concentrate may be readily mixed with lubricating oils to prepare lubricating oil compositions. Suitable lubricating oils which can be used as diluents typically have viscosities in the range from about 35 to about 500 Saybolt Universal Seconds (SUS) at 100° F. (38° C.), although an oil of lubricating viscosity may be used.

Other additives that can be included in the lubricating oil compositions include rust inhibitors, foam inhibitors, corrosion inhibitors, metal deactivators, pour point depressants, antioxidants, and a variety of other well-known additives. It is also contemplated the polyimide compounds described herein be employed as dispersants and detergents in hydraulic fluids, marine crankcase lubricants, and the like. When so employed, the polyimide compound can be present in an amount of from 0.1 to 10 weight percent (e.g., from 0.5 to 8 weight percent) by weight to the oil.

Fuel Compositions

As discussed above, the polyimide compounds described herein can also be used as fuel additives. When used in fuels, the proper concentration of the additive necessary in order to achieve the desired detergency is dependent upon a variety of factors including the type of fuel used, the presence of other detergents or dispersants or other additives, etc. Generally, however, the range of concentration of the polyimide compound in the base fuel can be from 10 to 10,000 weight parts per million (e.g., from 30 to 5000 parts per million weight parts per million) base fuel. If other detergents are present in the composition, a lesser amount of the additive may be used.

The polyimide compounds may be formulated as a fuel concentrate, using an inert stable oleophilic organic solvent boiling in the range of from 150° F. to 400° F. In some cases, an aliphatic or an aromatic hydrocarbon solvent is used, such a benzene, toluene, xylene or higher-boiling aromatics or aromatic thinners. Aliphatic alcohols of about 3 to 8 carbon atoms, such as isopropanol, isobutylcarbinol, n-butanol and the like, in combination with hydrocarbon solvents are also suitable for use with the fuel additive. In the fuel concentrate, the polyimide will be ordinarily at least 5 percent by weight and generally not exceed 70 percent by weight, preferably from 5 to 50 and more preferably from 10 to 25 weight percent.

In certain embodiments, the fuel composition can comprise a major amount of hydrocarbons boiling in the gasoline or diesel range and a polyimide compound described herein. In certain embodiments, the fuel can comprise a diesel fuel as defined by ASTM D975-17 entitled "Standard Specification for Diesel Fuel Oils," which is hereby incorporated herein by reference in its entirety. In certain embodiments, the fuel composition can comprise from 100 to 5000 ppm for the polyimide compound.

Methods

Also provided are methods of preparing the polyimide compounds described herein. For example, methods for preparing a polyimide compounds can comprise (a) providing a polymeric tail precursor comprising a terminal anhydride moiety (e.g., polyisobutenyl succinic anhydride (PIBSA)); and (b) condensing the polymeric tail precursor with a bivalent linker and a tetracarboxylate, an ester thereof, an acid halide thereof, or a cyclic dianhydride thereof to form the polyimide compound.

The bivalent linker can be a compound defined by the formula

H$_2$N—Y—NH$_2$ where Y is chosen from alkylene, heteroalkylene, cycloalkylene, heterocycloalkylene, arylene, heteroarylene, alkylarylene, alkylheteroarylene, polyalkyleneoxy, or polyalkenylamino.

In some embodiments, step (b) can comprise condensing the polymeric tail precursor with a bivalent linker and a cyclic dianhydride. The cyclic dianhydride can, in some cases, be chosen from one of the following

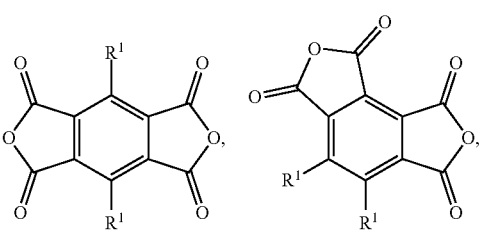

-continued

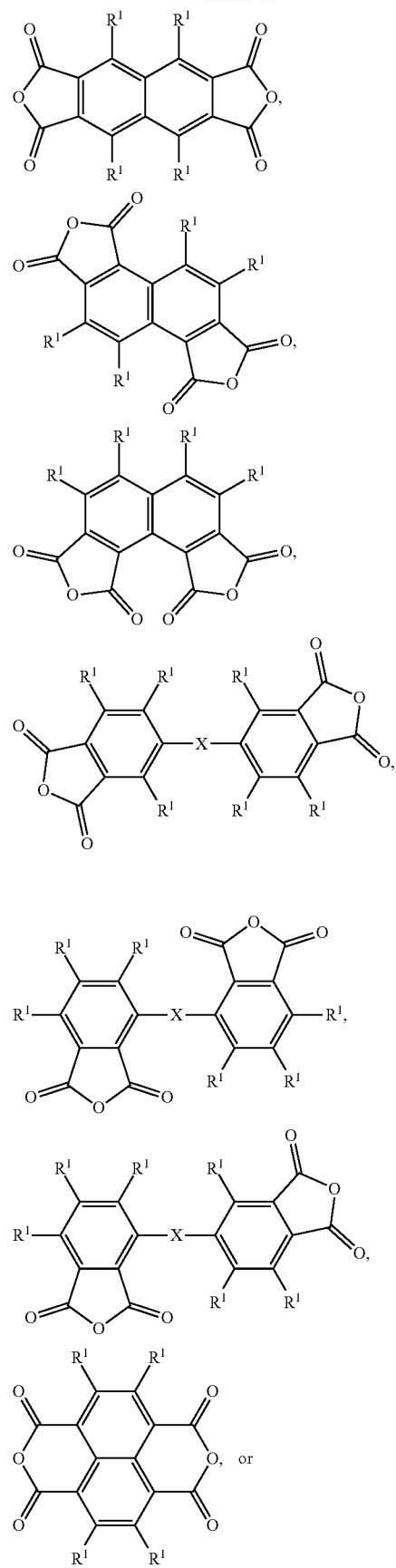

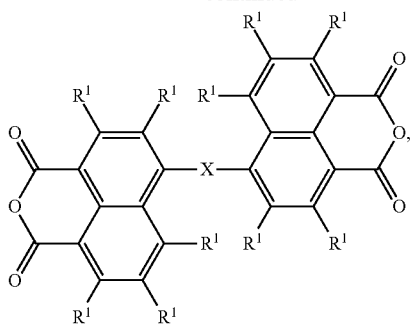

where X is absent, or represents

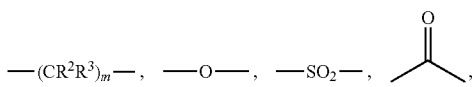

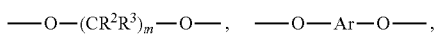

polyalkyleneoxy, or polyalkenylamino; $R^1$ represents, independently for each occurrence, H, halogen, alkyl, heteroalkyl, cycloalkyl, heterocycloalkyl, alkoxy, aryl, heteroaryl, alkylaryl, or alkylheteroaryl, or wherein permissible, two adjacent $R^1$ groups, together with the atoms to which they are attached, form a 5-8 membered substituted or unsubstituted aromatic or non-aromatic ring; $R^2$ and $R^3$ represent, independently for each occurrence, H, halogen, alkyl, heteroalkyl, cycloalkyl, heterocycloalkyl, alkoxy, aryl, heteroaryl, alkylaryl, or alkylheteroaryl; Ar represents an aryl group; and m is an integer from 1 to 12.

In some embodiments, step (b) can comprise combining the polymeric tail precursor, the bivalent linker, and the tetracarboxylate, an ester thereof, an acid halide thereof, or a cyclic dianhydride thereof to form a reaction mixture, and heating the reaction mixture to a temperature of at least 100° C. (e.g., a temperature of from 120° C. to 200° C.). The polymeric tail precursor, the bivalent linker, and the tetracarboxylate, an ester thereof, an acid halide thereof, or a cyclic dianhydride thereof can be combined simultaneously (e.g., in a one-pot reaction). Alternatively, the polymeric tail precursor can be combined with the bivalent linker and allowed to react before subsequently being reacted with the tetracarboxylate, an ester thereof, an acid halide thereof, or a cyclic dianhydride thereof. Optionally, step (b) can comprise removing water from the reaction mixture to drive formation of the polyimide compound.

Also provided herein are methods for preparing a polyimide compound, the method comprising (a) providing a polymeric tail precursor comprising a terminal amine moiety (e.g., polyisobutylene amine (PIBA)); and (b) condensing the polymeric tail precursor with a tetracarboxylate, an ester thereof, an acid halide thereof, or a cyclic dianhydride thereof to form the polyimide compound.

In some embodiments, step (b) can comprise condensing the polymeric tail precursor with a cyclic dianhydride. The cyclic dianhydride can, in some cases, be chosen from one of the following

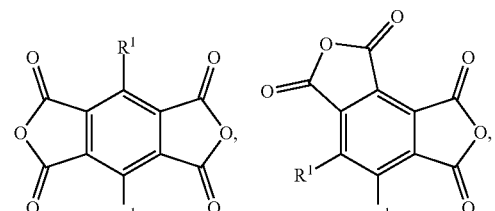

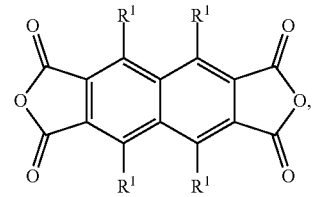

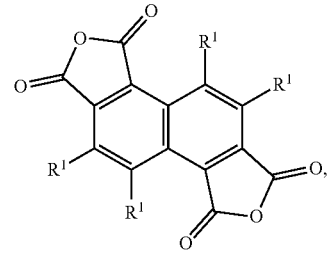

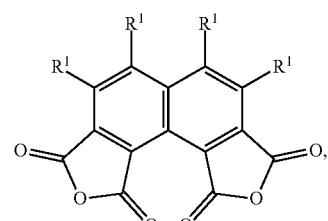

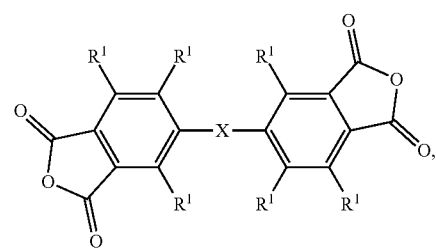

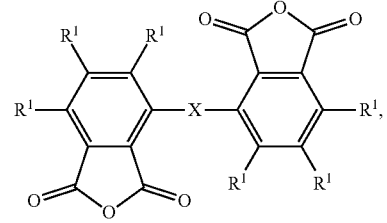

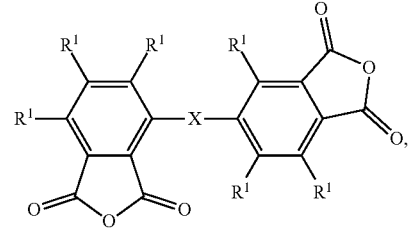

-continued

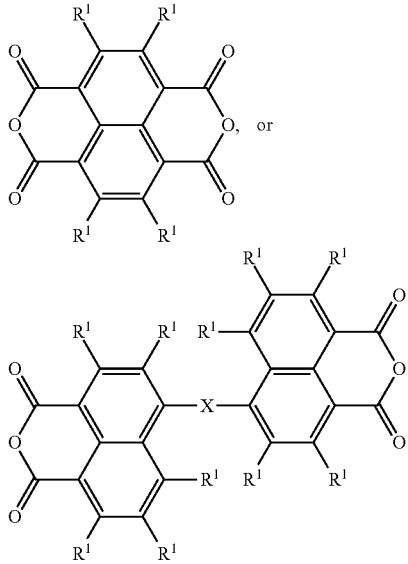

where X is absent, or represents

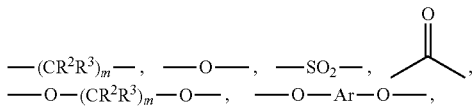

polyalkleneoxy, or polyalkenylamino; $R^1$ represents, independently for each occurrence, H, halogen, alkyl, heteroalkyl, cycloalkyl, heterocycloalkyl, alkoxy, aryl, heteroaryl, alkylaryl, or alkylheteroaryl, or wherein permissible, two adjacent $R^1$ groups, together with the atoms to which they are attached, form a 5-8 membered substituted or unsubstituted aromatic or non-aromatic ring; $R^2$ and $R^3$ represent, independently for each occurrence, H, halogen, alkyl, heteroalkyl, cycloalkyl, heterocycloalkyl, alkoxy, aryl, heteroaryl, alkylaryl, or alkylheteroaryl; Ar represents an aryl group; and m is an integer from 1 to 12.

In some embodiments, step (b) can comprise condensing the polymeric tail precursor and the tetracarboxylate, an ester thereof, an acid halide thereof, or a cyclic dianhydride thereof with a bivalent linker. The bivalent linker can be a compound defined by the formula

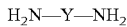

where Y is chosen from alkylene, heteroalkylene, cycloalkylene, heterocycloalkylene, arylene, heteroarylene, alkylarylene, alkylheteroarylene, polyalkyleneoxy, or polyalkenylamino.

In some embodiments, step (b) can comprise combining the polymeric tail precursor, the tetracarboxylate, an ester thereof, an acid halide thereof, or a cyclic dianhydride thereof, and the bivalent linker, when present to form a reaction mixture, and heating the reaction mixture to a temperature of at least 100° C. (e.g., a temperature of from 120° C. to 200° C.). The polymeric tail precursor, the bivalent linker, when present, and the tetracarboxylate, an ester thereof, an acid halide thereof, or a cyclic dianhydride thereof can be combined simultaneously (e.g., in a one-pot reaction). Alternatively, the polymeric tail precursor can be combined with the bivalent linker, when present, and allowed to react before subsequently being reacted with the tetracarboxylate, an ester thereof, an acid halide thereof, or a cyclic dianhydride thereof. Optionally, step (b) can comprise removing water from the reaction mixture to drive formation of the polyimide compound.

Also provided are methods for preparing a polyimide compound that comprise (a) generating a quasiliving polyolefin in a reversible deactivation-type living polymerization; (b) adding to the reversible deactivation-type living polymerization of step (a) a quenching agent to generate a quenched precursor; (c) reacting the quenched precursor to form an amine-capped polymeric tail precursor; and (d) condensing the amine-capped polymeric tail precursor with a tetracarboxylate, an ester thereof, an acid halide thereof, or a cyclic dianhydride thereof to form the polyimide compound.

Methods of generating quasiliving polyolefins in reversible deactivation-type living polymerizations are known in the art. Non-limiting examples of such methods are described in WO 2006/110647 A1, both of which are incorporated by reference herein. In some embodiments, the reversible deactivation-type living polymerization can be a reversible deactivation-type living carbocationic polymerization, also referred to as a quasiliving carbocationic polymerization.

In some embodiments, a monomer, an initiator, and a Lewis acid are used. In some embodiments, an electron donor, common ion salt, and/or common ion salt precursor is/are used. In some embodiments, the ionized polyolefin is a quasiliving carbocationic polyisobutylene. In some embodiments, the quasiliving carbocationic polyolefin can be generated from a preformed polyolefin.

In some embodiments, step (a) can comprise combining a Lewis acid and a monomer (e.g., isobutylene) with an initiator in the presence of an electron donor, common ion salt, common ion salt precursor, or combination thereof.

In some embodiments, the Lewis acid can be a non-protic acid. In some embodiments, the Lewis acid can be a metal halide or non-metal halide. In certain embodiments, the Lewis acid is a metal halide. For example, the Lewis acid can be a titanium (IV) halide (e.g., titanium tetrabromide, titanium tetrachloride), a zinc (II) halide (e.g., zinc chloride), a tin (IV) halide, or an aluminum (III) halide (e.g., aluminum tribromide, methyl aluminum dichloride). In certain embodiments the Lewis acid can be a non-metal halide. For example, the Lewis acid can be an antimony (VI) halide, a gallium (III) halide, or a boron (III) halide (e.g., boron trichloride). Other suitable Lewis acids include trialkyl aluminum compounds, such as trimethyl aluminum. In some cases, a single Lewis acid can be used. In other cases, a mixture of two or more Lewis acids can be used.

The initiator can be a compound or polyolefin with one, or more than one, end group capable of initiating a cationic olefin polymerization. For example, the initiator can be a compound of formula $(X'\text{---}CR_aR_b)_rR_c$ wherein $R_a$ and $R_b$ are independently hydrogen, alkyl, aryl, alkaryl, or aralkyl, provided that at least one of $R_a$ or $R_b$ is not hydrogen; $R_c$ is an aliphatic or aromatic univalent or polyvalent radical with valence r, wherein r is an integer from one to 4; and X' is acyl, alkoxy, hydroxy, or halogen. In some embodiments, $R_a$, $R_b$ and $R_c$ are hydrocarbon groups containing one carbon atom to about 20 carbon atoms. In some embodiments, $R_a$, $R_b$ and $R_c$ are hydrocarbyl groups containing one carbon atom to about 8 carbon atoms. In some embodiments, X' is a halogen. In some embodiments, X' is chloride. In some embodiments, the structure of $R_a$, $R_b$ and $R_c$ mimics the growing species or monomer. In some embodiments, the structure is a 1-halo-1-tolylethane initiator for polystyrene or a 2-halo-2,4,4-trimethyl pentane initiator for polyisobutylene. In some embodiments, $R_a$, $R_b$ and $R_c$ are each hydrocarbon groups containing one carbon atom to about 10 carbon atoms for the initiation of an isobutylene polymerization. In some embodiments, the initiator is a cumyl, dicumyl or tricumyl halide. In some embodiments, r is 1 or 2.

Examples of suitable initiators include 2-chloro-2-phenylpropane, i.e., cumyl chloride; 1,4-di(2-chloro-2-propyl)benzene, i.e., di(cumylchloride); 1,3,5-tri(2-chloro-2-propyl)benzene, i.e., tri(cumylchloride); 2-acetoxy-2-phenylpropane, i.e., cumyl acetate; 2-propionyloxy-2-phenyl propane, i.e., cumyl propionate; 2-methoxy-2-phenylpropane, i.e., cumylmethyl ether; 1,4-di(2-methoxy-2-propyl)benzene, i.e., di(cumylmethyl ether); 1,3,5-tri(2-methoxy-2-propyl)benzene, i.e., tri(cumylmethyl ether); 2-chloro-2,4,4-trimethyl pentane (TMPCl); 2-chloro-2,4,4,6,6-pentamethylheptane (PMHCl); 1,3-di(2-chloro-2-propyl)benzene; 2,6-dichloro-2,4,4,6-tetramethylheptane; and 1,3-di(2-chloro-2-propyl)-5-tert-butylbenzene (bDCC).

The initiator can be mono-functional, bi-functional, or multi-functional. Examples of suitable mono-functional initiators include 2-chloro-2-phenylpropane, 2-acetoxy-2-phenylpropane, 2-propionyloxy-2-phenylpropane, 2-methoxy-2-phenylpropane, 2-ethoxy-2-phenylpropane, 2-chloro-2,4,4-trimethylpentane, 2-acetoxy-2,4,4-trimethylpentane, 2-propionyloxy-2,4,4-trimethylpentane, 2-methoxy-2,4,4-trimethylpentane, 2-ethoxy-2,4,4-trimethylpentane, or 2-chloro-2,4,4-trimethylpentane, 2-chloro-2,4,4,6,6-pentamethylheptane, 2-acetoxy-2,4,4,6,6-pentamethylheptane, 2-propionyloxy-2,4,4,6,6-pentamethylheptane, 2-methoxy-2,4,4,6,6-pentamethylheptane, and 2-ethoxy-2,4,4,6,6-pentamethylheptane. In some embodiments, the initiator can be 2-chloro-2,4,4-trimethylpentane. Examples of suitable bi-functional initiators include 1,3-di(2-chloro-2-propyl)benzene, 1,3-di(2-methoxy-2-propyl)benzene, 1,4-di(2-chloro-2-propyl)benzene, 1,4-di(2-methoxy-2-propyl)benzene, 1,3-di(2-chloro-2-propyl)-5-tert-butylbenzene, 1,3-di(2-methoxy-2-propyl)-5-tert-butylbenzene, 2,6-dichloro-2,4,4,6-tetramethylheptane, or 2,6-dimethoxy-2,4,4,6-tetramethylheptane. In some embodiments, the initiator is 1,3-di(2-chloro-2-propyl)-5-tert-butylbenzene or 2,6-dichloro-2,4,4,6-tetramethylheptane. In some embodiments, the initiator can be 1,3-di(2-chloro-2-propyl)-5-tert-butylbenzene. Examples of suitable multi-functional (tri-functional) initiators include 1,3,5-tri(2-chloro-2-propyl)benzene, 1,3,5-tri(2-bromo-2-propyl)benzene, or 1,3,5-tri(2-methoxy-2-propyl)benzene.

The monomer can be a hydrocarbon monomer, i.e., a compound containing only hydrogen and carbon atoms, including but not limited to, olefins and diolefins, and those having from about 2 to about 20 carbon atoms. In some embodiments, such compounds have from about 4 to about 8 carbon atoms. Examples of suitable monomers include isobutylene, styrene, beta pinene, isoprene, butadiene, or substituted compounds of the preceding types. In some embodiments, the monomer is isobutylene, 2-methyl-1-butene, 3-methyl-1-butene, 4-methyl-1-pentene, or styrene. In some embodiments, the monomer is isobutylene. If desired for a particular application, mixtures of monomers can be used.

If desired, electron donors can be used in conjunction with the reversible deactivation-type living polymerizations described herein. In some embodiments, the electron donor can be capable of complexing with Lewis acids. In some embodiments, the electron donor can be a base and/or nucleophile. In some embodiments, the electron donor can be capable of abstracting or removing a proton. In some embodiments, the electron donor can be an organic base. In some embodiments, the electron donor can be an amide (e.g., N,N-dimethylformamide, N,N-dimethylacetamide, or N,N-diethylacetamide). In some embodiments, the electron donor can be a sulfoxide (e.g., dimethyl sulfoxide). In some embodiments, the electron donor can be an ester (e.g., methyl acetate or ethyl acetate). In some embodiments, the electron donor can be a phosphate compound (e.g., trimethyl phosphate, tributyl phosphate, or triamide hexamethylphosphate). In some embodiments, the electron donor can be an oxygen-containing metal compound (e.g., tetraisopropyl titanate). In some embodiments, the electron donor is pyridine or a pyridine derivative (e.g., 2,6-di-tert-butylpyridine, 2,6-lutidine, 2,4-lutidine, 2,4,6-trimethylpyridine, 2-methylpyridine, or pyridine). Other suitable electron donors include N,N-dimethylaniline or N,N-dimethyltoluidine.

If desired, common ion salts or salt precursors may be optionally added to the reaction mixture in addition to or in replacement of the electron donor. In some embodiments, such salts may be used to increase the ionic strength, suppress free ions, and interact with ligand exchange. Examples of suitable common ion salts or salt precursors include tetra-n-butylammonium chloride, tetra-n-butylammonium bromide, tetra-n-butylammonium iodide.

Step (b) can comprise adding to the reversible deactivation-type living polymerization of step (a) with a suitable quenching agent to generate a quenched precursor. In some embodiments, step (b) is performed for about 5 minutes to about 120 minutes. In some embodiments, step (b) is performed for about 15 minutes to about 90 minutes. In some embodiments, step (b) is performed for about 30 minutes to about 60 minutes.

In some embodiments, prior to step (b), the reversible deactivation-type living polymerization of step (a) is terminated and subsequently reactivated zero, one, or more times at a desired time. In some embodiments, the reversible deactivation-type living polymerization of step (a) is terminated and subsequently reactivated zero times, i.e., after generation of the quasiliving polyolefin of step (a), the reversible deactivation-type living polymerization of step (a) is not terminated at any time prior to step (b). In some embodiments, the reversible deactivation-type living polymerization of step (a) is terminated and subsequently reactivated one time.

In some embodiments, step (b) is performed (e.g., the quenching agent is added) after high conversion of the monomer. In particular embodiments, step (b) is performed (e.g., the quenching agent is added) after 80%, 85%, 90%, 95%, 97%, 99%, or 99.9% of the monomer has been polymerized into the quasiliving polyolefin.

Step (d) can comprise condensing the amine-capped polymeric tail precursor with a cyclic dianhydride. The cyclic dianhydride can, in some cases, be chosen from one of the following

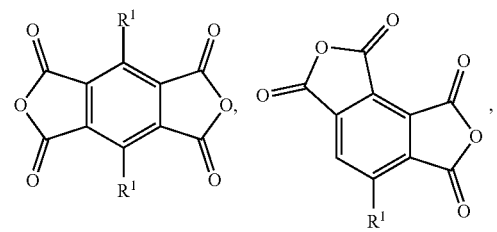

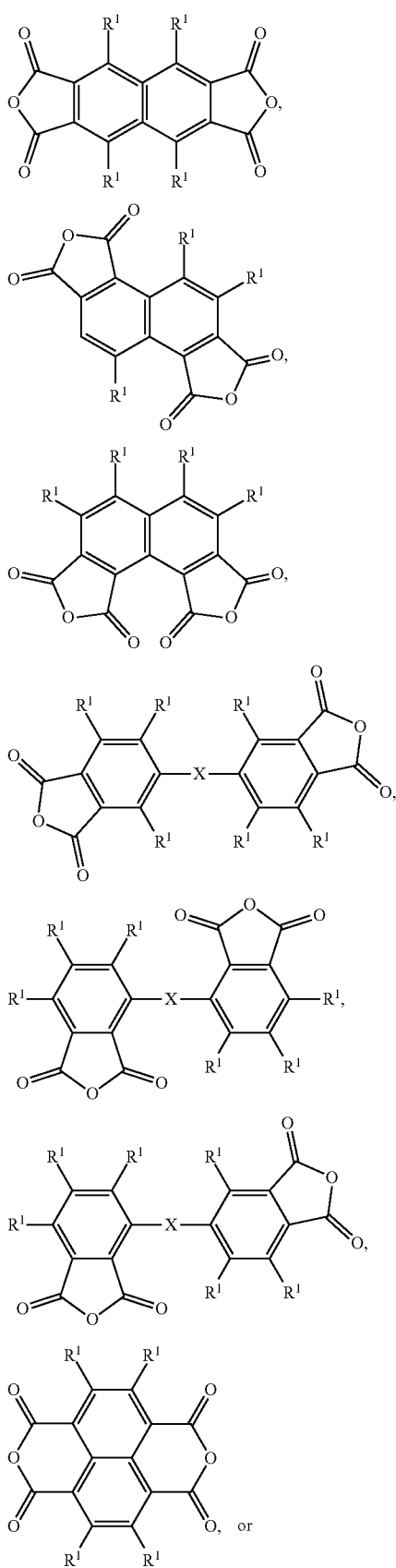

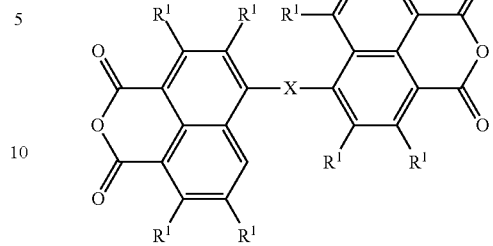

where X is absent, or represents

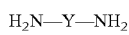

—(CR$^2$R$^3$)$_m$—, —O—, —SO$_2$—,

—O—(CR$^2$R$^3$)$_m$—O—, —O—Ar—O—, polyalkyleneoxy, or polyalkenylamino; R$^1$ represents, independently for each occurrence, H, halogen, alkyl, heteroalkyl, cycloalkyl, heterocycloalkyl, alkoxy, aryl, heteroaryl, alkylaryl, or alkylheteroaryl, or wherein permissible, two adjacent R$^1$ groups, together with the atoms to which they are attached, form a 5-8 membered substituted or unsubstituted aromatic or non-aromatic ring; R$^2$ and R$^3$ represent, independently for each occurrence, H, halogen, alkyl, heteroalkyl, cycloalkyl, heterocycloalkyl, alkoxy, aryl, heteroaryl, alkylaryl, or alkylheteroaryl; Ar represents an aryl group; and m is an integer from 1 to 12.

In some embodiments, step (d) can comprise condensing the amine-capped polymeric tail precursor and the tetracarboxylate, an ester thereof, an acid halide thereof, or a cyclic dianhydride thereof with a bivalent linker. The bivalent linker can be a compound defined by the formula

H$_2$N—Y—NH$_2$ where Y is chosen from alkylene, heteroalkylene, cycloalkylene, heterocycloalkylene, arylene, heteroarylene, alkylarylene, alkylheteroarylene, polyalkyleneoxy, or polyalkenylamino.

In some embodiments, step (d) can comprise combining the amine-capped polymeric tail precursor, the tetracarboxylate, an ester thereof, an acid halide thereof, or a cyclic dianhydride thereof, and the bivalent linker, when present to form a reaction mixture, and heating the reaction mixture to a temperature of at least 100° C. (e.g., a temperature of from 120° C. to 200° C.). Optionally, step (d) can comprise removing water from the reaction mixture to drive formation of the polyimide compound.

By way of non-limiting illustration, examples of certain embodiments of the present disclosure are given below.

EXAMPLES

The general synthetic strategy employed to prepare the polyimide compounds of Examples 1-9 is illustrated in Scheme 1 below.

Scheme 1. Synthetic strategy for the preparation of polyimides from PIBSA, a diamine, and a dianhydride.

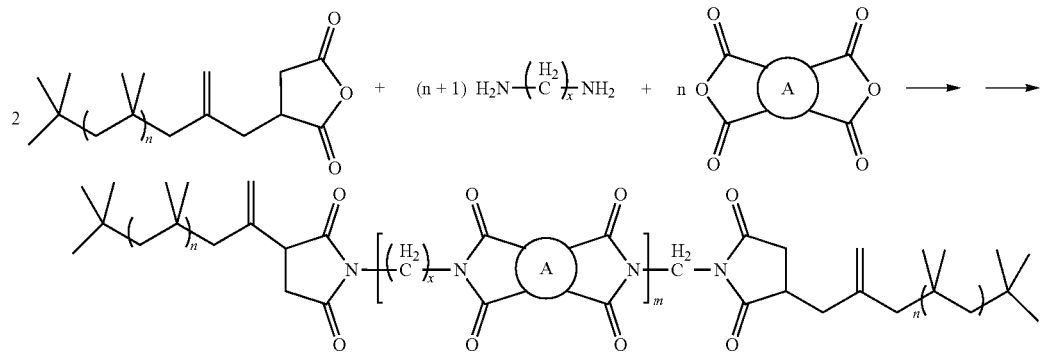

Example 1: Polyimide from PIBSA, 1,6-Hexane Diamine, and Naphthalene Dianhydride The reaction was carried out in a 4-neck 4000 mL glass kettle equipped with a distillation apparatus, a thermocouple, and an agitator. To the reactor, 1004 grams of 2300 MW PIBSA (45 wt % diluent oil, saponification number of 36 mg KOH/g) was charged and heated to 135° C. under nitrogen sweep. Subsequently, 33.7 grams of 1,6-haxane diamine was charged to initiate the imidation reaction. After all the diamine was charged, the temperature was set to 145° C. Aliquots were collected to monitor the succinimide formation, evidenced by the disappearance of the bands for C=O st. sym. in 1860-1770 cm$^{-1}$ range and C=O st. asym. in 1800-1720 cm$^{-1}$ range. New bands around 1770-1700 cm$^{-1}$ for the corresponding imide was observed as the reaction product was formed.

The reaction was allowed to proceed for 1 hour, after which vacuum was applied (<50 mmHg) for 0.5 hour to remove residual moisture and drive formation of the succinimide. The reaction was cooled to 70° C. and 1400 mL of anisole was charged into the reactor for dilution. Subsequently, 22.3 grams of naphthalene dianhydride was charged and the reaction temperature was set back to 145° C. for another 2 hour reaction hold time. The reaction mixture was then held under vacuum (<50 mmHg) for 1 hour to drive off any remaining water and remove the solvent. The product was filtered hot through Celite® 512 and analyzed using $^1$H- and $^{13}$C-NMR and size-exclusion chromatography. The acid number (using the method described in ASTM D664-11a entitled "Standard Test Method for Acid Number of Petroleum Products by Potentiometric Titration," which is incorporated herein by reference), total base number (using the method described in ASTM D2896-15 entitled "Standard Test Method for Base Number of Petroleum Products by Potentiometric Perchloric Acid Titration," which is incorporated herein by reference), and nitrogen content (using the method described in ASTM D5291-16 entitled "Standard Test Methods for Instrumental Determination of Carbon, Hydrogen, and Nitrogen in Petroleum Products and Lubricants," which is incorporated herein by reference) were also measured. The estimated number average molecular weight of the polyimide by size exclusion chromatography was 6500 g/mol with a polydispersity index of 1.47. The average number of imides moieties per molecule was estimated to be 4.26

Examples 2-8

Further reactions were conducted under similar conditions as Example 1. The identity of the dianhydride and/or diamine was varied, as well the relative charge ratios of the reactants. The components used to prepare Examples 2-8 are detailed in Table 1 below.

TABLE 1

Reagents used to prepare Examples 1-9 as well as characterization of the resulting products.

| | | | | Product | | |
|---|---|---|---|---|---|---|
| Example | Dianhydride | PIBSA/DiAm/DiAnh (molar ratio) | Oil (Wt. %) | N (wt. %) | TBN (mgKOH/g) | Mn (g/mol) MWD |
| Diamine: hexane diamine | | | | | | |
| 1 | naphthalic | 2/1.8/1 | 55.2 | 0.66 | 5.87 | 6520  1.47 |
| 2 | benzophenone | 2/1.8/1 | 55.2 | 0.76 | 2.89 | 7220  1.54 |
| 3 | pyromellitic | 2/1.8/1.1 | 55.2 | 0.71 | 3.59 | 7467  1.67 |
| 4 | pyromellitic | 2/2/1 | 55.2 | 0.71 | 1.44 | 5874  1.68 |
| 5 | pyromellitic | 2/1.6/1 | 55.2 | 0.68 | 1.13 | 6573  1.37 |
| 6 | pyromellitic | 2/1.8/0.9 | 55.2 | 0.32 | 1.09 | 4477  1.82 |
| 7 | pyromellitic | 2/1.8/1 | 55.2 | 0.67 | 1.31 | 6288  1.68 |
| 9* | pyromellitic | 2/1.8/1.1 | 55.2 | 0.71 | 3.59 | 7467  1.67 |
| Diamine: ethylene diamine | | | | | | |
| 8 | pyromellitic | 2/1.8/1 | 55.2 | 0.72 | 2.24 | 4457  1.82 |

*Used the same reagents as Example 3, except all reagents were added at the same time

Example 9. One-Pot Synthesis of a Polyimide

A one-pot method for preparing polyimides by charging all reactants at once was investigated. The reaction was carried out in a 4-neck 500 mL glass round bottom flask equipped with a distillation apparatus, a thermocouple, and an agitator. 154 grams of 2300 MW PIBSA (45 wt % diluent oil, saponification number of 36 mgKOH/g), 200 mL of anisole, 2.53 grams of pyromellitic dianhydride, and 1,6-hexane diamine were charged to the flask, and the reaction was heated to 145° C. under nitrogen sweep. Aliquots were collected to monitor the succinimide formation, evidenced by the disappearance of the bands for C=O st. sym. in 1860-1770 cm$^{-1}$ range and C=O st. asym. in 1800-1720 cm$^{-1}$ range. New bands at 1770-1700 cm-were observed for the corresponding polyimide product. The reaction was allowed to progress for 2 hours, and then vacuum applied to remove residual water and solvent. The product was analyzed via $^1$H-NMR, $^{13}$C-NMR, and size-exclusion chromatography. The acid number (using the method described in ASTM D664-11a entitled "Standard Test Method for Acid Number of Petroleum Products by Potentiometric Titration," which is incorporated herein by reference), total base number (using the method described in ASTM D2896-15 entitled "Standard Test Method for Base Number of Petroleum Products by Potentiometric Perchloric Acid Titration," which is incorporated herein by reference), and nitrogen content (using the method described in ASTM D5291-16 entitled "Standard Test Methods for Instrumental Determination of Carbon, Hydrogen, and Nitrogen in Petroleum Products and Lubricants," which is incorporated herein by reference) were also measured. The estimated number average molecular weight of the polyimide by size exclusion chromatography was 7458 g/mol with a polydispersity index of 1.72. The average number of imides moieties per molecule was estimated to be 5.

The general synthetic strategy employed to prepare the polyimide compound of Example 10 is illustrated in Scheme 2 below.

st. sym. in 1860-1770 cm$^{-1}$ range and C=O st. asym. in 1800-1720 cm$^{-1}$ range. New bands at 1770-1700 cm$^{-1}$ were observed for the corresponding polyimide product. After 2 hours, the reaction mixture was cooled to 100° C. and full vacuum was applied for 30 min to remove residual moisture and drive formation of the cyclic imides. The product was filtered hot through Celite® 512 and analyzed using $^1$H-NMR, $^{13}$C-NMR, and size-exclusion chromatography. The nitrogen content was also measured using the method described in ASTM D5291-16 entitled "Standard Test Methods for Instrumental Determination of Carbon, Hydrogen, and Nitrogen in Petroleum Products and Lubricants," which is incorporated herein by reference. The number average molecular weight of the polyimide by size exclusion chromatography was 1,900 g/mol with a polydispersity index of 1.51. The total nitrogen content was 0.93%.

Formulation Baseline A

A baseline lubricating oil composition was prepared which contained conventional amounts of an oxidation inhibitor package, a calcium-based detergent package containing a phenate and sulfonates, zinc dithiophosphate, viscosity index improver, pour point depressant, foam inhibitor and the balance lube oil.

Comparative Example A

A lubricating oil composition was prepared by adding 6 wt % of ethylene carbonate post-treated PIB Succinimide to Formulation Baseline A.

Example 11

A lubricating oil composition was prepared by adding the additive prepared in Example 1 to Formulation Baseline A for a 6 wt % dosage.

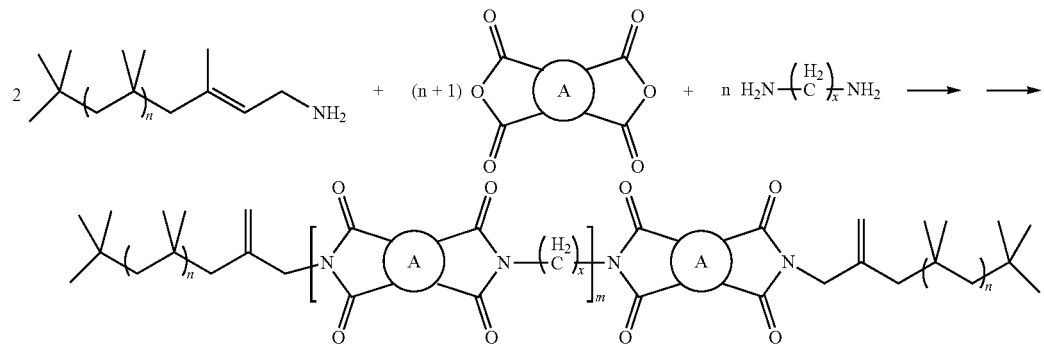

Scheme 2. Synthetic strategy for the preparation of polyimides from PIBA, a diamine, and a dianhydride.

Example 10: Polyimide from PIBA, 1,6-Hexane Diamine, and Pyromellitic Dianhydride The reaction was carried out in a 4-neck 200 mL round bottom flask equipped with a distillation apparatus, a thermocouple, and a stir bar. To the reactor, 100 mL anisole, 31 grams of 1000 MW PIBA (35 wt % diluent oil), 1.16 grams of 1,6-haxane diamine, and 4.36 grams pyromellitic dianhydride were charged at 0° C. The reaction mixture was warmed up to room temperature and after 30 min to 150° C. Aliquots were collected to monitor the succinimide formation, evidenced by the disappearance of the bands for C=O

Example 12

A lubricating oil composition was prepared by adding the additive prepared in Example 3 to Formulation Baseline A for a 6 wt % dosage.

Example 13

A lubricating oil composition was prepared by adding the additive prepared in Example 10 to Formulation Baseline A for a 6 wt % dosage.

Soot Thickening Bench Test

The lubricating oil compositions using Baseline Formulation A comprising 6, 4 or 2% wt. polyimides described herein (as well as Comparative Example A) were evaluated for dynamic viscosity using a soot test. The soot test measures the ability of the formulation to disperse and control viscosity increase resulting from the addition of carbon black, a soot surrogate. In this test, glass tubes were charged with 40 g of lubricating oil and affixed to a condenser. Each oil was heated at 200° C. with 115 mL/min of air flow bubbling through the oil for 8 hours. Then, 0.5 g of VULCAN® XC72R carbon black (Cabot Corporation) was added to 12 g of each oxidized oil. The resulting mixture was heated in a 60° C. oven for 16 hours. After removal from the oven, the mixture was stirred for 1 minute and then homogenized using a paint shaker for 30 minutes to completely disperse the carbon black. The mixture was then heated in a vacuum oven (full vacuum, <25 mm Hg) at 100° C. for 30 minutes. The mixture was removed from the vacuum oven and stirred using a vortex mixer for 30 seconds just prior to measuring viscosity. The dynamic viscosity of each lubricating oil containing carbon black was then measured at 100° C. for 900 seconds at a shear rate of 0.65 s$^{-1}$ on a TA Instruments AR-G2 rheometer using a cone and plate geometry, wherein the cone is stainless steel with a 60 mm diameter and a 2° angle. Sample temperature was controlled with a Peltier plate temperature control system. The dynamic viscosity reported is the value at the end of test (EOT). Lower dynamic viscosity indicates improved soot dispersion. For each set of measurements conducted using Examples 11, 12, and 13, a measurement of Comparative Example A was performed to provide a point of reference. The results of the soot test are summarized in Table 2 below.

TABLE 2

| Example | EOT Viscosity (Pa · s) |
| --- | --- |
| 11 | 0.078 |
| 12 | 0.376 |
| 13 | 2.038 |
| Comparative Example A | 1.095 |

Soot handling measurements of Examples 11 and 12 showed an improved soot handling performance at same treat rate of 6% wt. dispersant, demonstrating increased potency of the polyimides described herein as dispersants in reducing soot-induced viscosity as compared to the carbonate post-treated PIB Succinimide in Comparative Example A.

Reference Oil

A fully formulated lubricating oil containing 3.5 wt % of ethylene carbonate post-treated PIB Succinimide as a reference dispersant component was prepared for DV4TD engine test screener.

Example 14

A lubricating oil composition was prepared by replacing the reference dispersant component in Reference Oil with the polyimide prepared in Example 1 at 3.5 wt % dosage.

Example 15

A lubricating oil composition was prepared by replacing the reference dispersant component in Reference Oil with the polyimide prepared in Example 3 at 3.5 wt % dosage Evaluation of Lubricating Oil Compositions The polyimides synthesized in Examples 1 and 3 were further tested for soot handling in a Peugeot DV4TD screener engine test (CEC L-93-04). In this test, a fully formulated heavy-duty diesel engine oil is run continuously for 120 h; the engine is cycled, 2 min at 1100 rpm followed by 27 min at 4000 rpm. The lubricating oil compositions prepared in Examples 14 and 15 were evaluated using the Peugeot DV4TD screener engine test. For purposes of comparison, the Reference Oil was also evaluated. The soot content and viscosity of the oils were monitored every 24 hours. The results are plotted in FIG. 1. As shown in FIG. 1, the lubricating oil compositions prepared in Examples 14 and 15 exhibited a lower viscosity increase with increasing soot level than the Reference Oil composition, indicating improved dispercancy.

The compositions and methods of the appended claims are not limited in scope by the specific compositions and methods described herein, which are intended as illustrations of a few aspects of the claims. Any compositions and methods that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed. Other than where noted, all numbers expressing geometries, dimensions, and so forth used in the specification and claims are to be understood at the very least, and not as an attempt to limit the application of the doctrine of equivalents to the scope of the claims, to be construed in light of the number of significant digits and ordinary rounding approaches.

Unless defined otherwise, all technical and scientific terms used herein have the same meanings as commonly understood by one of skill in the art to which the disclosed invention belongs. Publications cited herein and the materials for which they are cited are specifically incorporated by reference.

What is claimed is:

1. A polyimide compound defined by Formula I below

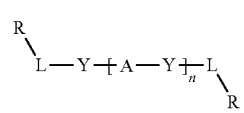

Formula I wherein

A, individually for each occurrence, represents a cyclic diimide moiety represented by the structure below

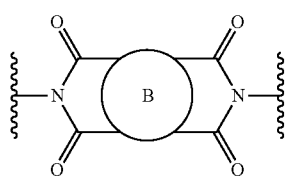

where B represents a cyclic moiety substituted with a first cyclic imide group and a second cyclic imide group;

Y, individually for each occurrence, represents a bivalent linking group;

L, individually for each occurrence, is absent or represents a cyclic imide group;

R, individually for each occurrence, represents a polymeric tail; and n is an integer from 1 to 20.

2. The compound of claim 1, wherein Y is, individually for each occurrence, chosen from alkylene, heteroalkylene, cycloalkylene, heterocycloalkylene, arylene, heteroarylene, alkylarylene, alkylheteroarylene, polyalkyleneoxy, or polyalkenylamino.

3. The compound of claim 1, wherein Y is, individually for each occurrence, comprises from 2 to 30 carbon atoms.

4. The compound of claim 1, wherein B comprises an aryl group.

5. The compound of claim 1, wherein the first cyclic imide group comprises a five-membered cyclic imide ring and the second cyclic imide group comprises a five-membered cyclic imide ring.

6. The compound of claim 5, wherein A is chosen from one of the following

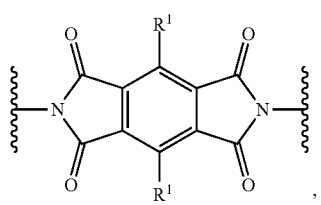
,
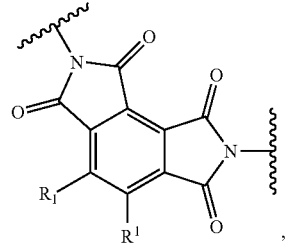
,
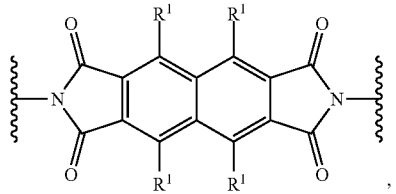
,

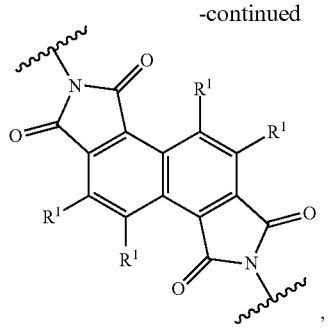
,
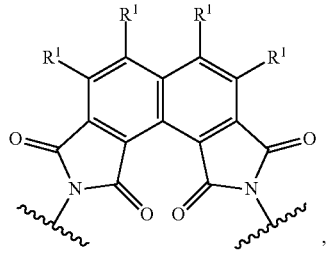
,
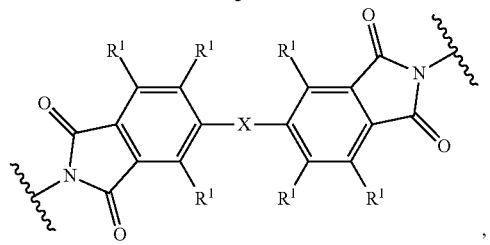
,
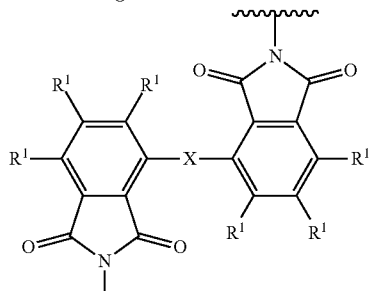
,
or
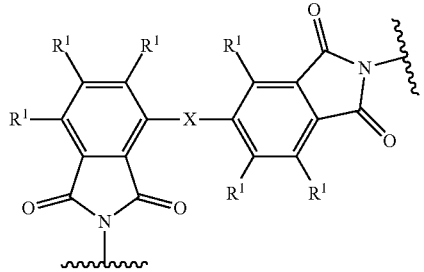
, wherein
X is absent, or represents

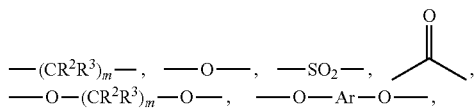

polyalkyleneoxy, or polyalkenylamino;

$R^1$ represents, independently for each occurrence, H, halogen, alkyl, heteroalkyl, cycloalkyl, heterocycloalkyl, alkoxy, aryl, heteroaryl, alkylaryl, or alkylheteroaryl, or wherein permissible, two adjacent $R^1$ groups, together with the atoms to which they are attached, form a 5-8 membered substituted or unsubstituted aromatic or non-aromatic ring;

$R^2$ and $R^3$ represent, independently for each occurrence, H, halogen, alkyl, heteroalkyl, cycloalkyl, heterocycloalkyl, alkoxy, aryl, heteroaryl, alkylaryl, or alkylheteroaryl;

Ar represents an aryl group; and m is an integer from 1 to 12.

7. The compound of claim 1, wherein the first cyclic imide group comprises a six-membered cyclic imide ring and the second cyclic imide group comprises a six-membered cyclic imide ring.

8. The compound of claim 7, wherein A is chosen from one of the following

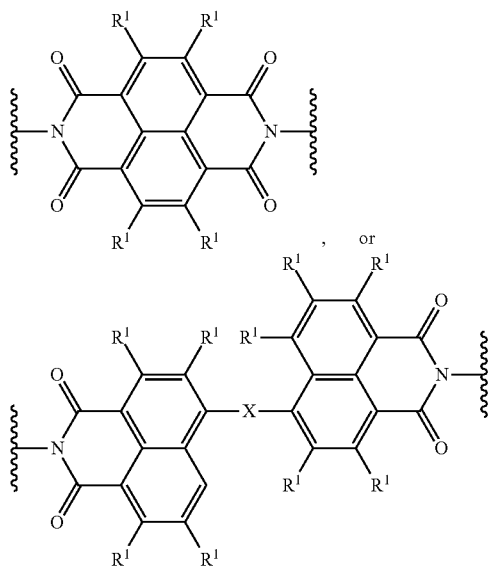

wherein

X is absent, or represent

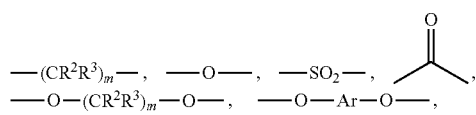

polyalkyleneoxy, or polyalkenylamino;

$R^1$ represents, independently for each occurrence, H, halogen, alkyl, heteroalkyl, cycloalkyl, heterocycloalkyl, alkoxy, aryl, heteroaryl, alkylaryl, or alkylheteroaryl, or wherein permissible, two adjacent $R^1$ groups, together with the atoms to which they are attached, form a 5-8 membered substituted or unsubstituted aromatic or non-aromatic ring;

$R^2$ and $R^3$ represent, independently for each occurrence, H, halogen, alkyl, heteroalkyl, cycloalkyl, heterocycloalkyl, alkoxy, aryl, heteroaryl, alkylaryl, or alkylheteroaryl;

Ar represents an aryl group; and m is an integer from 1 to 12.

9. The compound of claim 1, wherein n is an integer from 1-6.

10. The compound of claim 1, wherein R is a hydrophobic moiety.

11. The compound of claim 1, wherein R is chosen from a polyolefin group, a polyetheramine group; a polyalkenylamine group; a polyalkyleneoxy group, or a combination thereof.

12. The compound of claim 1, wherein R comprises a polyolefin group terminated by an initiator residue.

13. The compound of claim 1, wherein R comprises a polyisobutylene group terminated by an initiator residue.

14. The compound of claim 1, wherein L is absent.

15. The compound of claim 14, where the compound is defined by Formula IA below

wherein

A and n are as defined above with respect to Formula I, $R^x$ is an initiator residue; and $R^a$ is a polyolefin group.

16. The compound of claim 1, where the compound is defined by Formula IB below

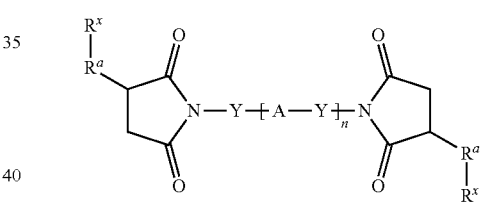

wherein

A, Y, and n are as defined above with respect to Formula I, $R^x$ is an initiator residue; and $R^a$ is a polyolefin group.

17. The compound of claim 16, wherein $R^a$ comprises a polyisobutylene group.

18. The compound of claim 1, wherein n is 1.

19. The compound of claim 1, wherein the compound is a dispersant for use in lubricating oils and R has a molecular weight of from 1,000 Da to 2,500 Da.

20. The compound of claim 1, wherein the compound is an additive for use in a hydrocarbon fuel and R has a molecular weight of less than 1,000 Da.

* * * * *